United States Patent
Koehler et al.

(10) Patent No.: US 10,594,813 B1
(45) Date of Patent: Mar. 17, 2020

(54) DISCOVERY OF UNIQUE ENTITIES ACROSS MULTIPLE DEVICES

(71) Applicant: Google LLC, Mountain View, CA (US)

(72) Inventors: James R. Koehler, Boulder, CO (US); Zachary Charles Frazier, Seattle, WA (US); Thomas A. Vaughan, Seattle, WA (US); Sheng Ma, Fair Lawn, NJ (US); Evgeny Skvortsov, Kitchener (CA)

(73) Assignee: Google LLC, Mountain View, CA (US)

( * ) Notice: Subject to any disclaimer, the term of this patent is extended or adjusted under 35 U.S.C. 154(b) by 285 days.

(21) Appl. No.: 15/487,229

(22) Filed: Apr. 13, 2017

Related U.S. Application Data

(60) Provisional application No. 62/322,432, filed on Apr. 14, 2016.

(51) Int. Cl.
  *H04L 29/08* (2006.01)
  *G06N 7/00* (2006.01)
  *G06N 20/00* (2019.01)
  *H04L 29/12* (2006.01)

(52) U.S. Cl.
  CPC .......... *H04L 67/22* (2013.01); *G06N 7/00* (2013.01); *G06N 20/00* (2019.01); *H04L 67/146* (2013.01); *H04L 67/18* (2013.01); *H04L 61/609* (2013.01)

(58) Field of Classification Search
  None
  See application file for complete search history.

(56) References Cited

U.S. PATENT DOCUMENTS

2008/0243824 A1* 10/2008 Riise ............... G06F 16/29

OTHER PUBLICATIONS

'www.wikipedia.com' [online] Cross Validation (statistics), Last Update Apr. 17, 2017, [retrieved on Apr. 24, 2017] Retrieved from Internet: URL<https://en.wikipedia.org/wiki/Cross-validation_(statistics)> 8 pages.
Dahner. "Modeling Pageviews across multiple websites with an application to internet reach and frequency prediction," Marketing Science 26(3), May 1, 2007, 17 pages.
(Continued)

*Primary Examiner* — Philip C Lee
(74) *Attorney, Agent, or Firm* — Fish & Richardson P.C.

(57) ABSTRACT

Methods, systems, and apparatus include computer programs encoded on a computer-readable storage medium, including a method for discovering unique entities over multiple devices. A virtual pool of entities is created and divided into subpools, each including fewer than all entities. Subpools are subdivided into delta pools. Cookies are recorded for each delta pool when the particular portion of content is presented to or accessed by entities in the delta pool. Recorded cookies are divided into cookie types based on cookie characteristics. Machine learning and statistical analysis algorithms are used to automatically determine sizes of delta pools and probabilities of each cookie type being classified as belonging to particular delta pools. Virtual entities are assigned from the virtual pool to each of the recorded cookies that were recorded when the particular portion of content was presented. A number of unique entities that accessed the particular portion of content is determined.

3 Claims, 19 Drawing Sheets

(56) References Cited

OTHER PUBLICATIONS

Deville et al. "Calibration Estimators in Survey Sampling," Journal of the American Statistical Association, 87(418), Jun. 1992, 8 pages.
Georg. "Estimating reach curves from one data point," Technical report, Google, Inc., Nov. 21, 2014, 7 pages.
Hunag et al. "Modeling the audience's banner ad exposure for internet advertising planning," Journal of Advertising, 35(2), May 1, 2006, 15 pages.
Jin et al. "The incremental reach and cost efficiency of online video ads over TV ads," Technical Report, Google, Inc., 2012, 17 pages.

* cited by examiner

DISCOVERY OF UNIQUE ENTITIES ACROSS MULTIPLE DEVICES

CROSS-REFERENCE TO RELATED APPLICATION

This application claims priority to U.S. Provisional Application No. 62/322,432, filed on Apr. 14, 2016. The disclosure of the prior application is considered part of and is incorporated by reference in the disclosure of this application.

BACKGROUND

This specification relates to data processing and cross-device online activity.

Users can be exposed to a particular portion of content, an online advertisement, a website, audible information, or a video channel through the use of numerous various devices, including desktop computers, smartphones, tablets, gaming systems, and other devices (e.g., virtual assistant devices). Because users can be exposed to content on multiple different devices, it is difficult to determine whether a particular user of a particular device has previously been exposed to a particular portion of content while previously using a different device. Therefore, a particular user may be exposed to the same content on various different devices.

SUMMARY

In general, another innovative aspect of the subject matter described in this specification can be implemented in methods that include a method for determining a number of unique entities that accessed a particular portion of content. The method includes: creating a virtual pool of entities, the virtual pool having a virtual pool size equal to a size of a given set of entities; dividing the virtual pool into a number of sub-pools that each include fewer than all entities in the virtual pool; sub-dividing each of the sub-pools into delta pools; recording cookies for each of the delta pools when the particular portion of content is presented to or accessed by entities in the delta pools; dividing the recorded cookies into cookie types based on characteristics of each recorded cookie; automatically determining, using a suite of machine learning and statistical analysis algorithms, sizes of the delta pools and probabilities of each cookie type being classified as belonging to particular ones of the delta pools; assigning virtual entities from the virtual pool to each of the recorded cookies that were recorded when the particular portion of content was presented or accessed; and determining a number of unique entities that accessed the particular portion of content, including counting a number of virtual entities that were assigned to the recorded cookies.

These and other implementations can each optionally include one or more of the following features. Dividing the virtual pool can be based on characteristics of entities including, for each individual, a geographic location, demographic information, or characteristics of the individuals. The characteristics of each recorded cookie can include: a geographic location of a device on which the recorded cookie was placed; and inferred demographics based on contents of the recorded cookie. Determining the number of unique entities can include counting a number of unique virtual entities that were assigned to the recorded cookies.

In general, another aspect of the subject matter described in this specification can be implemented a non-transitory computer storage medium encoded with instructions that when executed by a distributed computing system cause the distributed computing system to perform operations including: creating a virtual pool of entities, the virtual pool having a virtual pool size equal to a size of a given set of entities; dividing the virtual pool into a number of sub-pools that each include fewer than all entities in the virtual pool; sub-dividing each of the sub-pools into delta pools; recording cookies for each of the delta pools when the particular portion of content is presented to or accessed by entities in the delta pools; dividing the recorded cookies into cookie types based on characteristics of each recorded cookie; automatically determining, using a suite of machine learning and statistical analysis algorithms, sizes of the delta pools and probabilities of each cookie type being classified as belonging to particular ones of the delta pools; assigning virtual entities from the virtual pool to each of the recorded cookies that were recorded when the particular portion of content was presented or accessed; and determining a number of unique entities that accessed the particular portion of content, including counting a number of virtual entities that were assigned to the recorded cookies.

These and other implementations can each optionally include one or more of the following features. Dividing the virtual pool can be based on characteristics of entities including, for each individual, a geographic location, demographic information, or characteristics of the individuals. The characteristics of each recorded cookie can include: a geographic location of a device on which the recorded cookie was placed; and inferred demographics based on contents of the recorded cookie. Determining the number of unique entities can include counting a number of unique virtual entities that were assigned to the recorded cookies.

In general, one aspect of the subject matter described in this specification can be implemented in systems that include one or more processors and one or more memory elements including instructions that, when executed, cause the one or more processors to perform operations, the operations including: creating a virtual pool of entities, the virtual pool having a virtual pool size equal to a size of a given set of entities; dividing the virtual pool into a number of sub-pools that each include fewer than all entities in the virtual pool; sub-dividing each of the sub-pools into delta pools; recording cookies for each of the delta pools when the particular portion of content is presented to or accessed by entities in the delta pools; dividing the recorded cookies into cookie types based on characteristics of each recorded cookie; automatically determining, using a suite of machine learning and statistical analysis algorithms, sizes of the delta pools and probabilities of each cookie type being classified as belonging to particular ones of the delta pools; assigning virtual entities from the virtual pool to each of the recorded cookies that were recorded when the particular portion of content was presented or accessed; and determining a number of unique entities that accessed the particular portion of content, including counting a number of virtual entities that were assigned to the recorded cookies.

These and other implementations can each optionally include one or more of the following features. Dividing the virtual pool can be based on characteristics of entities including, for each individual, a geographic location, demographic information, or characteristics of the individuals. The characteristics of each recorded cookie can include: a geographic location of a device on which the recorded cookie was placed; and inferred demographics based on contents of the recorded cookie. Determining the number of unique entities can include counting a number of unique virtual entities that were assigned to the recorded cookies.

Particular implementations may realize none, one or more of the following advantages. Automatic, algorithm-based techniques for more accurately determining an audience of unique users in a cross-device environment can be faster and can use less computer resources than other techniques.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
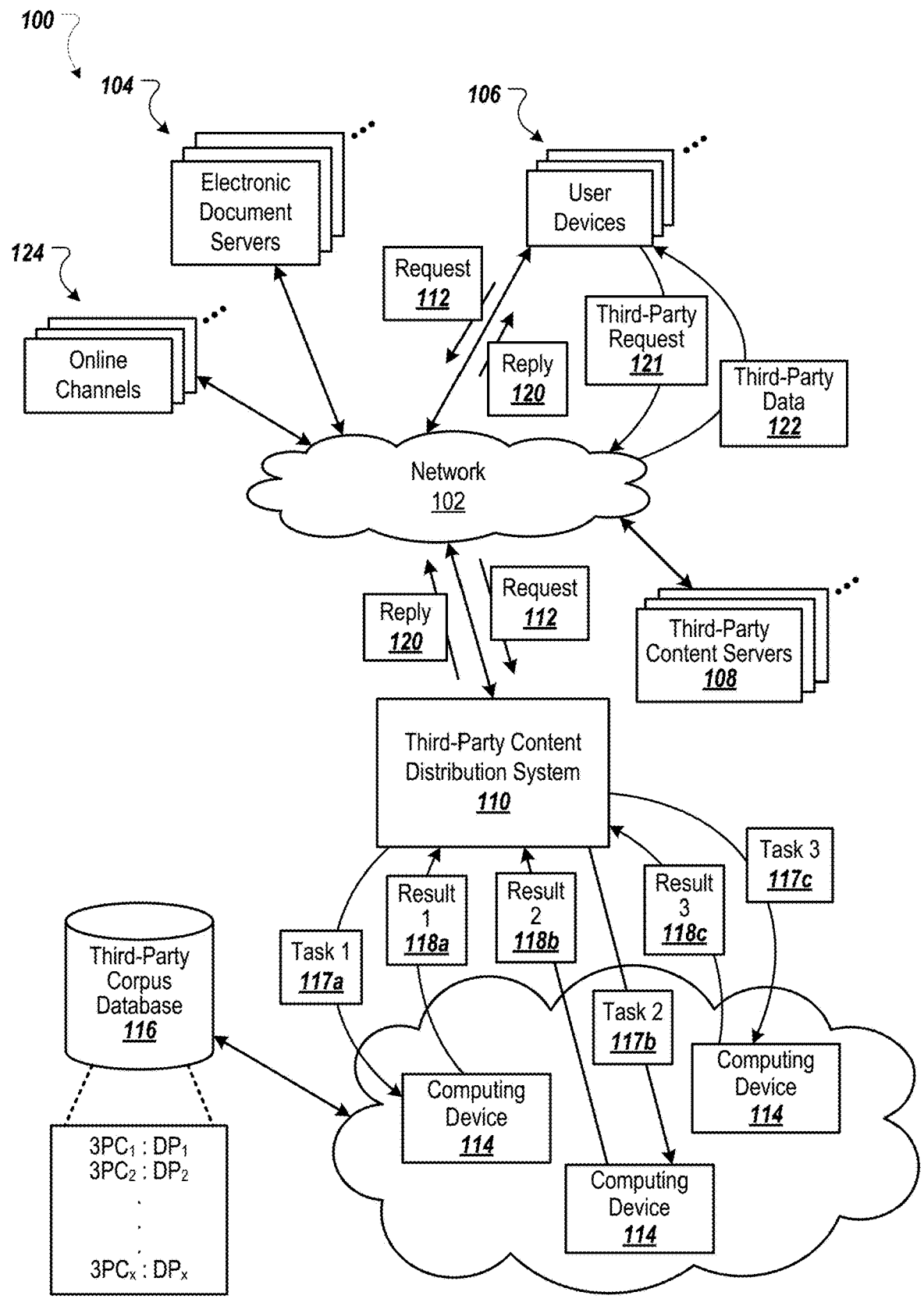
FIG. 1 is a block diagram of an example environment in which content is distributed over a network.

This document describes systems, methods, and computer program products that facilitate accurate determination of unique users across different device types. For example, techniques described in this document can be used to accurately determine a number of unique individuals that have accessed content, even when some of the same users have accessed the content from multiple different devices and/or device types or when multiple different users have accessed content (e.g., specific web page content or third-party content, including advertisements) from a same device. Generally, when content is accessed from a device, a cookie stored on that device is read and/or recorded by a remote server. However, these identifiers generally cannot be used to differentiate between unique individuals for the reasons because of the fact that multiple users may use a same device and/or because different devices used by the same user will generally have different cookies. Furthermore, because users may clear their cookies (i.e., erase the cookies from their device) at any time, it is difficult to use cookies to accurately determine how many unique individuals were exposed to a particular portion of content, or if a user requesting content has previously been presented a particular portion of content. As such, the ability to determine a number of unique individuals that were exposed to (or accessed) a particular portion of content is a challenge in the online environment.

As discussed in more detail throughout this document, a number of unique individuals that were exposed to (or accessed) a particular portion of content can be determined by creating a virtual pool of individuals that is equal to the size of a given set of individuals (e.g., the population of Earth), and then dividing the virtual pool into a number of sub-pools that each include fewer than all of the individuals in the virtual pool. The virtual pool can be divided on characteristics of individuals generally, such as geographic location, context data (e.g., information about online activity, interests, demographic information, or other contextual information) and/or characteristics of individuals in general. Each of the sub-pools can then be sub-divided into smaller pools, called "delta pools." Meanwhile, cookies that were recorded when a particular portion of content was presented or accessed are identified, and these identified cookies are divided into "cookie-types" based on the characteristics of the cookie (e.g., data included in the cookie). For example, the cookies can be divided based on characteristics such as a geographic location of the device on which the cookie was placed, inferred context information based on contents of the cookie, or other characteristics of the cookie. A suite of machine learning and statistical analysis algorithms are used to automatically determine sizes of the delta pools of individuals and probabilities of each cookie type being classified as belonging to one of the delta pools. Based on this information, virtual individuals from the virtual pool of individuals are assigned to each of the cookies that were recorded when the particular portion of content was presented or accessed, and the number of unique individuals that accessed the particular portion of content can be determined by counting the number of unique virtual people that were assigned to the cookies.

FIG. 1 is a block diagram of an example environment 100 in which content is distributed over a network. The example environment 100 includes a network 102, such as a local area network (LAN), a wide area network (WAN), the Internet, or a combination thereof. The network 102 connects electronic document servers 104, user devices 106, third-party content servers 108, and a third-party content distribution system 110 (also referred to as a content distribution system). The example environment 100 may include many different electronic document servers 104, user devices 106, and third-party content servers 108.

The third-party content distribution system 110 can determine a number of unique individuals exposed to or accessing a particular portion of content. For example, the same user may use different ones of the user devices 106 on which the same content is presented. Techniques described below can be used to count unique users exposed to a content item, as opposed to counting the number of user devices 106 without regard to information, such as from cookies or other sources, that counts unique users for those devices.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, online advertisements, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a third-party tag or third-party script that references the third-party content distribution system 110. In these situations, the third-party tag or third-party script is executed by the user device 106 when the given electronic document is processed by the user device 106. Execution of the third-party tag or third-party script configures the user device 106 to generate a request 112 for third-party content, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The request 112 can include data specifying the electronic document and characteristics of locations at which third-party content can be presented. For example, data specifying a reference (e.g., URL) to an electronic document (e.g., webpage) in which the third-party content will be presented, available locations (e.g., third-party content slots) of the electronic documents that are available to present third-party content, sizes of the available locations, positions of the available locations within a presentation of the electronic document, and/or media types that are eligible for presentation in the locations can be provided to the third-party content distribution system 110. Similarly, data specifying keywords designated for the selection of the electronic document ("document keywords") or entities (e.g., people, places, or things) that are referenced by the electronic document can also be included in the request 112 (e.g., as payload data) and provided to the third-party content distribution system 110 to facilitate identification of third-party content items that are eligible for presentation with the electronic document.

Requests 112 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Data specifying characteristics of the user device 106 can also be provided in the request 112, such as information that identifies a model of the user device 106, a configuration of the user device 106, or a size (e.g., physical size or resolution) of an electronic display (e.g., touchscreen or desktop monitor) on which the electronic document is presented. Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 selects third-party content (e.g., information about apps) that will be presented with the given electronic document in response to receiving the request 112 and/or using information included in the request 112. In some implementations, the third-party content is selected in less than a second to avoid errors that could be caused by delayed selection of the third-party content. For example, delays in providing third-party content in response to a request 112 can result in page load errors at the user device 106 or cause portions of the electronic document to remain unpopulated even after other portions of the electronic document are presented at the user device 106. Also, as the delay in providing third-party content to the user device 106 increases, it is more likely that the electronic document will no longer be presented at the user device 106 when the third-party content, thereby negatively impacting a user's experience with the electronic document. Further, delays in providing the third-party content can result in a failed delivery of the third-party content, for example, if the electronic document is no longer presented at the user device 106 when the third-party content is provided.

In some implementations, the third-party content distribution system 110 is implemented in a distributed computing system (or environment) that includes, for example, a server and a set of multiple computing devices 114 that are interconnected and identify and distribute third-party content in response to requests 112. The set of multiple computing devices 114 operate together to identify a set of third-party content that are eligible to be presented in the electronic document from among a corpus of millions of available third-party content (3PC1-x). The millions of available third-party content can be indexed, for example, in a third-party corpus database 116. Each third-party content index entry can reference the corresponding third-party content and/or include distribution parameters (DP1-DPx) (e.g., selection criteria) that condition the distribution of the corresponding third-party content.

In some implementations, the distribution parameters (e.g., selection criteria) for a particular third-party content can include distribution keywords that must be matched (e.g., by electronic documents or terms specified in the request 112) in order for the third-party content to be eligible for presentation. The distribution parameters can also require that the request 112 include information specifying a particular geographic region (e.g., country or state) and/or information specifying that the request 112 originated at a particular type of user device (e.g., mobile device or tablet device) in order for the third-party content to be eligible for presentation.

The identification of the eligible third-party content can be segmented into multiple tasks 117a-117c that are then assigned among computing devices within the set of multiple computing devices 114. For example, different computing devices in the set of multiple computing devices 114 can each analyze a different portion of the third-party corpus database 116 to identify various third-party content having distribution parameters that match information included in the request 112. In some implementations, each given computing device in the set of multiple computing devices 114 can analyze a different data dimension (or set of dimensions) and pass results 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more instances of third-party content that will be provided in response to the request 112. For example, the third-party content distribution system 110 can select a set of winning third-party content based on the outcome of one or more content evaluation processes, as discussed in further detail below. In turn, the third-party content distribution system 110 can generate and transmit, over the network 102, reply data 120 (e.g., digital data representing a reply) that enable the user device 106 to integrate the set of winning third-party content into the given electronic document, such that the set of winning third-party content and the content of the electronic document are presented together at a display of the user device 106.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request 121 to the third-party content server 108 to obtain a given winning third-party content from the third-party content server 108. In response to the request, the third-party content server 108 will transmit, to the user device 106, third-party data 122 that causes the given winning third-party content to be incorporated into the electronic document and presented at the user device 106.

The third-party content distribution system 110 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting.

In some implementations, the third-party content distribution system 110 may select winning third-party content in response to a given request from among a set of third-party content items (e.g., instances of third-party content) that have been deemed eligible to return to the user device 106 in response to that request. Eligible third-party content can be identified on a per-request basis according to various data specified in the request, or context associated with the request. For example, the request may indicate a permissible size or aspect ratio of the requested third-party content, and the third-party content distribution system 110 may filter the total set of available third-party content to a set of eligible content that satisfies the size or aspect ratio constraint, and any other applicable constraints. The evaluation process for selecting winning third-party content can then be performed only with respect to the set of eligible third-party content. In some examples, the evaluation process may involve scoring and ranking third-party content items. The winning third-party content item may be the highest-ranked item according to the scores. In some implementations, the ineligible third-party content may be excluded from the total set of available content before the content is scored and ranked. In some implementations, the ineligible third-party content may be excluded from the total set of available content after the content is scored and ranked.

When third-party content (or other content) are distributed to user devices 106, the distribution of the third-party content can be tracked. In some implementations, cookies are used to track the distribution of the third-party content. For example, the third-party content distribution system can access (or otherwise obtain) information from a cookie that is stored at the user device, and the information from the cookie with information specifying the third-party content that was distributed. However, challenges can arise when using cookies to track distribution of third-party content. For example, when a same user uses multiple different user devices to access content, each of those different devices will store a different cookie, such that it is difficult to determine that the same user is accessing content from each of the different devices. Further, multiple different users may use the same device (i.e., a single user device) to access content. In this situation, it is difficult to determine which of the users is accessing content with that device at any given time. As can be appreciated, these challenges make it difficult to determine a number of unique users that have accessed a particular portion of content.

As discussed in more detail below, the techniques discussed in this document allow for accurate determinations of how many unique users have accessed a particular portion of content, and enable unique audience measurement reports to be broken out by device types associated with different cookie types. For example, there can be a browser-cookie with device information on desktop, smartphone, and tablet, and another app-cookie broken out by smartphone and tablet.

The techniques described below enable multiple cookie counts to be converted to unique individual counts, also referred to as people counts using an Activity Distribution Function (ADF), which describes the probability of a person generating cookies of each type. ADFs can be related to matching cross-device reach functions. Furthermore, ADFs can be approximated by a mixture of Dirac delta functions and estimated empirically using panel data in which audience counts are determined and corrected based on actual cookie counts and information for unique users.

The discussion that follow begins with a description of how people counts are generated using a single device measurement method, including a description of a context correction model and cookie-to-user mapping. A "Context Correction Model" discussion follows, which extends the context correction model to multiple cookie types. A "Mapping Cookies to Users" discussion introduces cross-device cookie-to-user mapping techniques. Finally, the use of online panel data is discussed.

A single-device measurement method measures gross rating points (GRPs) and allows for reach and frequency estimates for online audiences to be broken down by audience attributes (e.g., age and gender). However, the approach only considers a single cookie or device type and therefore does not extend to multiple device types. Techniques described in this disclosure extend the single-device measurement methodology to provide device type breakouts across multiple devices. However, before describing extensions in detail, an overview is provided of the single-device measurement method.

Single-device measurement methods can use a combination of data from several different sources to compute audience reach metrics: US census data, content server logs from content serving networks, publisher-provided self-reported context data, and representative online panels. The number of people exposed to a campaign can be inferred from the number of unique cookies exposed to these campaigns. For a subset of these cookies, context data can be available from publisher provided data (PPD). These context labels may be incorrect for some of the cookies, and the cookies with labels may not be representative of all cookies. Context correction models can adjust for possible inaccurate and biased labels using panel data. Additionally, a user can be typically represented by multiple cookies, some of which may be shared with other users on the same device. A method can be provided to infer the number of users behind a given number of cookies. These models can be trained and evaluated using an online calibration panel for which the true context/PPD labels and cookie-to-user relationships are known.

The main data source for this method can be, for example, content server logs, recording the impressions served to an associated cookie. Content server logs can provide real-time data broken down by site. The use of cookies, however, can present significant technical challenges. For example, a cookie generally does not identify a person, but rather refers to a combination of computing device and a web browser. Also, not all cookies have context data or certain types of contextual attached to them, making it more difficult to determine the makeup of an audience (e.g., including the number of unique audience members). Another challenge is that cookie deletion (or cookie churn) can also lead to inaccuracies in audience measurement, such as the overstatement of a number of unique users that were exposed to a particular portion of content (e.g., ad) and/or an understatement of a frequency with which the particular portion of content has been exposed to the audience members. Yet another challenge is that the quality of declared context/interest information relies on users accurately inputting the data and also the extent to which cookies are shared between multiple users.

A probability-recruited online panel can provide reliable data to calibrate and validate the context correction and cookie-to-user conversion models. The panel can play a role in adjusting for context bias and cookie-sharing effects in PPD, such as in inferring models to accurately estimate the number of users behind aggregated cookie counts, and in evaluating the accuracy of the method. The panel can be aligned to census level benchmarks on context variables such as age or gender through the application of context weights. Weighting adjustments can help to reduce the bias of estimates by adjusting for context differences between the panel and the population it represents. This can help to adjust for the effects of panel attrition that may cause panels to become less representative of the population over time. An approach that calibrates content server logs using a smaller high-quality panel can cover a larger part of the long tail of the web than using a panel alone. A benefit of the approach is that the reach and frequency estimates can get both reduced variance from server logs and reduced bias from the panel.

Extensions of single-device measurement methods can include measurement and monitoring across all devices. Furthermore, the PPD labels can be recorded, for the panel, in the content server logs.

A context correction model can be for a single device. The estimate of a campaign's audience can consist of taking the total number of content impressions, unique cookies exposed to the campaign, and a subset of cookies with PPD context labels, and then breaking down the impressions and unique cookies into context groups. The impressions from each group, when divided by that group's population number and multiplied by 100, can estimate the GRPs for that group. Finally, by dividing the number of impressions by the number of exposed users from that group, an estimate can be made for the average frequency for that group. The following section describes models used to break either impressions or cookies into context groups.

Consider a problem that includes D context groups and one publisher providing PPD. Further, assume that a set of training campaigns is broken down by both panel context s and PPD labels. Let this data consist of $N_{train}$ campaigns, each large enough to be confidently measured by the panel. For campaign i, let $y_i$ be the proportion of panelist cookies (or impressions) for each of the panel-measured context groups (hence $y_i$ is a vector of length D). Similarly, let $x_i$ be a D-length vector for the PPD proportions. The relationship can be modeled, for example, as Equation 1:

$$y_i = (1-\alpha_i)Ax_i/|Ax_i|1 + \alpha_i Bx_i + \epsilon_i \quad (1)$$

where A is a D×D "correction" matrix, B is a D×D left-stochastic matrix, and a1 represents the fraction of cookies (impressions) for the ith campaign either served on the publisher's site or via cookie targeting using the PPD. Hence, $1-\alpha_i$ represents the fraction of unlabeled cookies (or unlabeled impressions) for that campaign. A left-stochastic matrix is a square matrix with non-negative entries and columns that sum to one.

If the PPD labels are perfect for the publisher's site, then B=I. But usually the PPD labels can have misclassification issues, and hence B can be a left-stochastic matrix. That is, the PPD context proportions can be re-distributed to better represent the actual population proportions for those cookies, with PPD labels exposed to the campaign. It can be possible to estimate B from panel cookies (impressions) that have PPD labels directly, rather than through a model fit.

Matrix A is used to measure cookies (impressions) without PPD labels. For these cookies (impressions), $x_i$ can be adjusted for both misclassification and non-representativeness between the labeled and non-labeled cookies (impression). If B has been fit directly from the panel, then the appropriate regression model can be given by Equation 2:

$$\tilde{y}_i = \frac{y_i - \alpha_i B x_i}{1 - \alpha_i} = \frac{A x_i}{|A x_i|} + \epsilon_i \quad (2)$$

and should be fit using either least squares or penalized least squares.

Single-device measurement method can use an equation for converting cookie counts to people counts. This equation depends on some defined time interval T in Equation 3:

$$u = \frac{c_{\gamma T} P_T}{C_T + c(\gamma T - 1)} \quad (3)$$

where u is the estimated people (user) counts, c is the cookie count, $P_T$ is the total active online population count during time interval T, $C_T$ is the total active cookie count during time interval T, and $\gamma T$ is a parameter to be estimated. It can be determined that typically $\gamma_T \approx \kappa C_T/P_T$ for $\kappa \approx 1$. Equation 3 does not generalize well for arbitrary T and doesn't adjust well for a particular context group, as $C_T$ is unknown for any given context group. An almost equivalent formulation that is useful for arbitrary T and for a given context group d is shown in Equation 4:

$$u_d = \frac{k_d c_d P_d}{P_d + k_d c_d} \quad (4)$$

where $P_d$ is the active online population (defined over a long time period—say 90 days) for group d, $c_d$ is the corrected cookie count for group d (output from Equation 1), and $\kappa_d$ is a parameter estimated for context group d. In practice, $\kappa_d$ can be set to the same κ for all context groups and can be close to 1.0 for mature cookies and slightly less than 1.0 for younger cookies.

Suppose there is a campaign with c total cookies exposed. Then, for an arbitrary person, the number of a user's cookies that are exposed, $c_i$, can follow a Poisson distribution with rate parameter λ, and these rate parameters, across people, can follow an exponential distribution shown in Equation 4a:

$$c_i \mid (x_i, c, P) \overset{ind}{\sim} \text{Poisson}(\lambda_i = x_i c / P) \quad (4a)$$

$$x_i \overset{iid}{\sim} \text{Exp}(1/\kappa_e)$$

Then it can be shown, by integrating out λ, that (in Equation 4b):

$$P(e_i > 0 \mid c) = \frac{\kappa_e c}{P + \kappa_e c} \quad (4b)$$

and hence by adding these probabilities over all P people that (in Equation 4c):

$$E[u \mid c] = \frac{\kappa_e c P}{P + \kappa_e c} \quad (4c)$$

by substituting $\theta = P\_/\kappa_{ec}$, which is the same as Equation 4. This cookie-to-user function can be called the Exponential Bow model. Note that the derivative of the Exponential Bow model, evaluated at the origin (c=0), is $\kappa_e$. Hence, $\kappa_e$ represents the expected number of people reached with the first impression and should be close to 1.0.

Consider another case where every person has the same rate parameter $\lambda_i = \kappa_0 c/P$ (i.e., $x_i = \kappa_0$); then $P(c_i > 0 \mid c) = 1 - e^{-\kappa_0 c/P}$. This cookie-to-user function can be called the Dirac Bow model. Note that for this model, $\kappa_0$ is the slope at the origin, so again should be close to 1.0. These concepts of heterogeneity of the rate parameter can be extended to the multi-device situation described below (in the "Context Correction Model" section) with respect to a general approach for mapping cookies to users.

Taken together, for a campaign with a total of I impressions on c cookies with normalized PPD labels x (a vector of size D), the "Impression" version of Equation 1 can be used to get the impression context breakdown (in Equation 4d)

$$I_d = y_d^I * I \quad (4d)$$

and the "Cookie" version of Equation 1 can be used to get the cookie context breakdown (in Equation 4e):

$$c_d = y_d^C * c \quad (4e)$$

Finally, Equation 4 can be used to convert cookies ($c_d$) to users while the average frequency is calculated as (Equation 4f):

$$\bar{f}_d = I_d / u_d \quad (4f)$$

Context Correction Model

A context correction model for cross-device measurement can be used for estimating GRPs for a single device type. A set of context correction models can be applied to impressions and cookies, respectively. Then, the results from the cookie-correction model can be input into a cookie-to-user model that estimates the unique number of people reached by the campaign. The following discussion generalizes the context correction model for multiple device types, while the "Mapping Cookies to Users" section below describes a general approach for mapping cookies to users and generalizes the conversion of multiple, post-corrected, cookie types to people.

The generalization of the context correction models to multiple device types uses a unique pair of models (impressions, cookies) that is estimated for each device type, as described above. However, the panel must be weighted properly to reflect the associated target audience. Most panels will have multiple weights. For example, weights for two device types can include weights for device 1, weights for device 2, and then either weights for (device 1 AND 2)

or for (device 1 OR 2). For the context correction models, the single device weights can typically be applied for each of the single device correction models. However, the joint weights can typically be used in developing the multi-device cookie-to-user models, as described below in a "Context Correction Model" section.

For device type j, the pair of context correction models can be built, including a model for impressions and a model for cookies. Specifically, the models can determine $N_{train}^j$ campaigns each large enough so that device type j activity is confidently measured by the panel. These training data should include cross-device campaigns but could also include single device campaigns. The training data can be used to estimate both the impression and correction models Equation 1 for device type j (Equations 5a and 5b):

$$y_{ij}^I = (1 - \alpha_{ij}^I)A_j^I x_{ij}^I / |A_j^I x_{ij}^I| + \alpha_{ij}^I B_j^I x_{ij}^I + \epsilon_{ij}^I \quad (5a)$$

$$y_{ij}^C = (1 - \alpha_{ij}^C)A_j^C x_{ij}^C / |A_j^C x_{ij}^C| + \alpha_{ij}^C B_j^C x_{ij}^C + \epsilon_{ij}^C \quad (5b)$$

where the superscript denotes impression or cookie data/parameters, the device specific subscript j indicates the data ($y_{ij}$, $x_{ij}$, and $\alpha_{ij}$) for campaign i and device j, and $A_j$ and $B_j$ are the device specific correction and redistribution matrices, respectively. If $I_{ij}$ and $c_{ij}$ are the device j's total impressions and cookies measured for campaign i, respectively, then context group d's estimates are $$I_{ij}^d = (y_{ij}^I)_d \cdot I_{ij} \text{ and } c_{ij}^d = (y_{ij}^C)d \cdot c_{ij}.$$

The vector $$c_i^d = (c_{i1}^d, c_{i2}^d, \ldots, c_{iJ}^d)'$$

is the input into the multiple-device reach function for campaign i and context group d.

Mapping Cookies to Users

A general approach for mapping cookies to users is now described. The model described above, for converting cookie counts for a specific context group into people counts, only handles one device type. In the discussion here, that model is extended to address the following needs.

A first need is to estimate the number of unique people in a cross-device audience. Estimates in this case need to deal with multiple types of cookie counts instead of just one cookie count. In particular, counts of cookies by device type and potentially app-specific logged-in user IDs. These cookie types can be treated differently, as churning behavior of desktop and mobile cookies is different. For example, some people are reachable only through a desktop computer or only through a mobile device.

A second need is to provide modeling flexibility. Equation 3 depends on one parameter and gives a reasonable first approximation of generic desktop cookie behavior. If sufficient training data is available, then the accuracy can be improved by a more flexible cookie-to-user model. This can be achieved for both single and multiple cookie types.

First, a method is introduced that involves individual device-specific reach functions. Then, a general approach is considered for estimating people counts from multiple cookie types.

Multiple device reach curves can be used in association with an independence assumption. For multiple cookie types, an assumption can be made that content on different device types reaches people independently from each other. That is, if reach of the j-th cookie type is given by function $R_j(c_j)^3$ (where $R_{j(\cdot)}$ is a reach function, so its maximum is one, as ($R(\infty)=1$)), then the overall (multi-cookie type) reach function can be computed (under this assumption) as (Equation 6):

$$R(c) = 1 - \prod_j (1 - R_j(c_j)) \quad (6)$$

This assumption can provide a way to construct a multi-device reach surface by fitting one dimensional marginals and then joining them. The assumption can be used for device types with high user penetration. For example, the assumption may not be true in a country where single-device ownership changes over time. As an extreme example, if a country has two types of people, such as owners of only device type 1 and owners of only device type 2, then the assumption breaks down as $R(c_1,c_2)=R_1(c_1)+R_2(c_2)$, as the true overlap is zero. Two adjustments can be made to this assumption, such as adjusting the model to accurately account for population device type adoption using census data, and possibly adjusting the overlap independence assumption using panel data.

Consider a situation in which only two device types are of interest. In this situation, let a population have $P_1$ users of only device 1, $P_2$ users of only device 2, and $P_{12}$ users of both devices. Assume, based on the single device models, estimates of reach for each device type, $R_j$. Then, a modification of Equation 6 is given in Equation 7:

$$R=P_1R_1+P_2R_2+P_{12}\cdot[1-(1-R_1)(1-R_2)]=(P_1+P_{12})R_1+(P_2+P_{12})R_2-P_{12}R_1R_2 \quad (7)$$

where the reach estimate for device j is applied directly to the device j subpopulation, and then the approach of Equation 6 is only applied to the cross-device subpopulation. This model can further be modified based on information from the panel that the cross-device subpopulation reach overlap doesn't satisfy the independence assumption by applying an additional parameter $\beta_{12}$ is given in Equation 8:

$$R=(P_1+P_{12})R_1+(P_2+P_{12})R_2-\beta_{12}P_{12}R_1R_2 \quad (8)$$

Here, $\beta_{12}=1$ matches the independence assumption, while $\beta_{12}<1$ matches a positive (>1 matches negative) correlation between the reach of the two device types.

The following section describes multiple device reach curves via activity-distribution functions. The modeling of the cookies-to-user mapping function can be generalized by introducing the concept of an activity distribution function (ADF) that models the heterogeneity of the number and type of cookies owned by people. It can be shown that any ADF directly relates to a reach function. This can be illustrated for the Exponential Bow and Dirac Bow models that were introduced above. Finally, two particularly useful ADFs can be presented: the first based on mixtures of Dirac functions which can model any arbitrary multiple device reach curve; and the second that extends the Exponential Bow to allow for more flexibility in modeling the reach curve.

For this section, to generalize to any population, a new variable t can be introduced for average cookie counts rather than raw cookie counts. That is, t=c/P, where P is the number of internet users. Particularly, for context group d, cookie counts can be converted for device j ($c_j$) by j($c_j$) by $t_j^d = c_j^d / P_d$, where $P_d$ is the Internet population for context group d. After dropping the dependence on d, $t=(t_1, t_2, \ldots, t_d)'$ can be defined as the input into the reach function. The reach function, R(∩), can be modeled, rather than the user function as presented below. Ultimately, the output from the reach function can be multiplied by P to yield number of people.

Assume that there is an underlying population of people (P), and each person has a certain probability of generating a cookie of each type. Let the (multivariate) probability distribution $\mathcal{A}$ model the heterogeneity of these probabilities. $\mathcal{A}$ can be converted to a cross-device reach surface using Equation 9:

$$R(t) = \int_{x \in \mathbb{R}+} \mathcal{A}(x) \cdot (1 - e^{-tx}) dx \qquad (9)$$

Cookie-to-user dependencies that occur in practice can arise from applying Equation 9 using an appropriate distribution. The function $\mathcal{A}$ can be called an Activity Distribution Function (ADF). The use of the ADF/reach function relationship for one-dimensional reach curves is illustrated next.

Recalling that the exponential Bow model with $\kappa_e > 0$ is defined in Equation 4c, converting this to a reach function and introducing t yields Equation 10:

$$R(t) = \frac{\kappa_e t}{\kappa t + 1}. \qquad (10)$$

This corresponds to an exponential cookie generation probability distribution (ADF) which is defined by Equation 11:

$$\mathcal{A}(x) = \frac{e^{-x/\kappa_e}}{\kappa_e} \qquad (11)$$

Notice that for this ADF, the expected number of cookies per person is $\kappa_e$. Interestingly, the exponential ADF has maximum entropy over all ADFs, under the condition that the expected number of cookies is fixed at $\kappa_e$.

Also recall the Dirac Bow model with $\kappa_0 > 0$. In terms of a reach function, this is defined as Equation 12:

$$R(t) = 1 - e^{-\kappa_0 t} \qquad (12)$$

The corresponding ADF is a Dirac delta function located at $\kappa_0$, thus Equation 13:

$$\mathcal{A}(x) = \delta(x - \kappa_0) \qquad (13)$$

Note that when assigning c cookies to a set of people, the Dirac ADF corresponds to distributing them according to a uniform distribution, i.e., each person has equal probability of being assigned any of the c cookies. Subsequently, the assignment of cookies-to-people can have maximum entropy.

The Dirac Bow model can be extended to higher dimensions by considering a multivariate Dirac Delta function located at $x^0 = (x_1^0, x_1^0, \ldots, x_J^0)'$. That is, the ADF can be defined as Equation 13a:

$$\mathcal{A}(x) = \delta(x - x^0) \qquad (13a)$$

The assumption of similar device usage across all people may not yield a particularly interesting ADF in itself. However, arbitrary heterogeneity can be added by considering mixtures of multivariate Dirac Delta functions, given in Equation 14:

$$\mathcal{A}(x) = \sum_i \alpha_i \delta(x - x_i^0). \qquad (14)$$

This ADF can include subpopulations of people, with each subpopulation having similar device usage. For example, subpopulation k can have usage centered at $x_i^0$, and the fraction of the population represented by this group can be $\alpha_k$. For this ADF, the associated reach surface is represented as a sum of exponents, given in Equation 15:

$$R(t) = \sum_i \alpha_i (1 - e^{x_i^0 \cdot t}) \qquad (15)$$

If training data exists in the form of $(t_i, p_i)^4$ (where $p_i$ is an estimate of the reach surface at $t_i$, so $P_i \sim R(t_i)$), and if a set of subpopulations centered at $x_i^0$ is chosen, then the set of coefficients αk's can be determined using constrained linear regression (as the αk≥0). The locations of $x_i^0$ can either be picked along a grid or found via local search. This approach is described below, and specific algorithms are discussed below.

The exponential ADF can often be a good approximation of the reach surface, but generalization of the exponential ADF can be considered in cases in which more flexibility is needed. The following discusses the one dimensional case. Multidimensional generalization can require working with more complex indices.

Consider the Generalized Exponential ADF of order N, defined for x>0, as Equation 15a:

$$\mathcal{A}(x) = e^{\sum_{n=0}^N \lambda_n x^n}. \qquad (15a)$$

for parameters $\lambda_0, \ldots, \lambda_n. \lambda_0, \ldots, \lambda_n^5$ (where $\lambda_N < 0$, and $\lambda_0$ is used as a normalizing constant so that A integrates to one). In this case, the reach curve can have the form in Equation 15b:

$$R(t \mid \lambda) = \int_0^\infty e^{\sum_{n=0}^N \lambda_n x^n} (1 - e^{-xt}) dx \qquad (15b)$$

Techniques for finding such parameters by matching first moments of the distribution are well known. Note that the moments of the distribution are equal to the corresponding derivatives of the reach curve evaluated at t=0 (e.g., the first moment is equal to the first derivative).

One algorithm that can be used for fitting the generalized exponential distribution in the context of reach estimation is a gradient descent algorithm. For example, the partial derivative of the reach curve with respect to $\lambda_k$ can have the form in Equation 16:

$$\frac{\partial R(t)}{\partial \lambda_k} = \int_0^\infty x^k e^{\sum_{n=0}^N \lambda_n x^n} (1 - e^{-xt}) dx \qquad (16)$$

which can be calculated by numeric integration. Thus, given a set of points of the reach curve $\{(t_i, r_i)\}$, the gradient of the reach estimation error can be calculated as (Equation 17):

$$\nabla_{\lambda_0, \ldots, \lambda_N} \left( \sum_i (R(t_i) - p_i)^2 \right) = 2 \sum_i \frac{\partial R(t)}{\partial \lambda_k} \cdot (R(t_i) - p_i) \qquad (17)$$

and used in the gradient descent algorithm to optimize the parameters $\lambda_0, \ldots, \lambda_N$.

The multiple device reach methods presented above can be illustrated using various simulation scenarios. For example, three examples are provided that demonstrate the performance of the Adaptive Dirac Mixture algorithm for estimating both the underlying ADFs and the reach surface. A brief example for fitting the Generalized Exponential reach curve is also provided.

An Adaptive Dirac Mixture (ADM) algorithm can be used as a general procedure for estimating the Dirac Mixture Model. The ADM algorithm can estimate the number of Dirac mixtures, their locations, and associated weights. Each of the examples can begin by constructing a true underlying ADF. Next, a training set of I campaigns can be constructed. For each campaign, cookie counts can be randomly simulated across multiple cookie types (i.e., $t_i$) using a truncated (at 0) Gaussian with mean 0.5 and standard deviation of 1.5. Equation 9 can then be used to find the corresponding reach. This leads to the construction of $(t_i, r_i)$ for $i=1, \ldots, I$. Finally, these as inputs to the ADM algorithm can be used to estimate the ADF and associated reach surface. It can be assumed that there is no error in the r's for the examples. Further, the simulations can indicate that the algorithm is robust against reasonable noise.

Figure 2A:
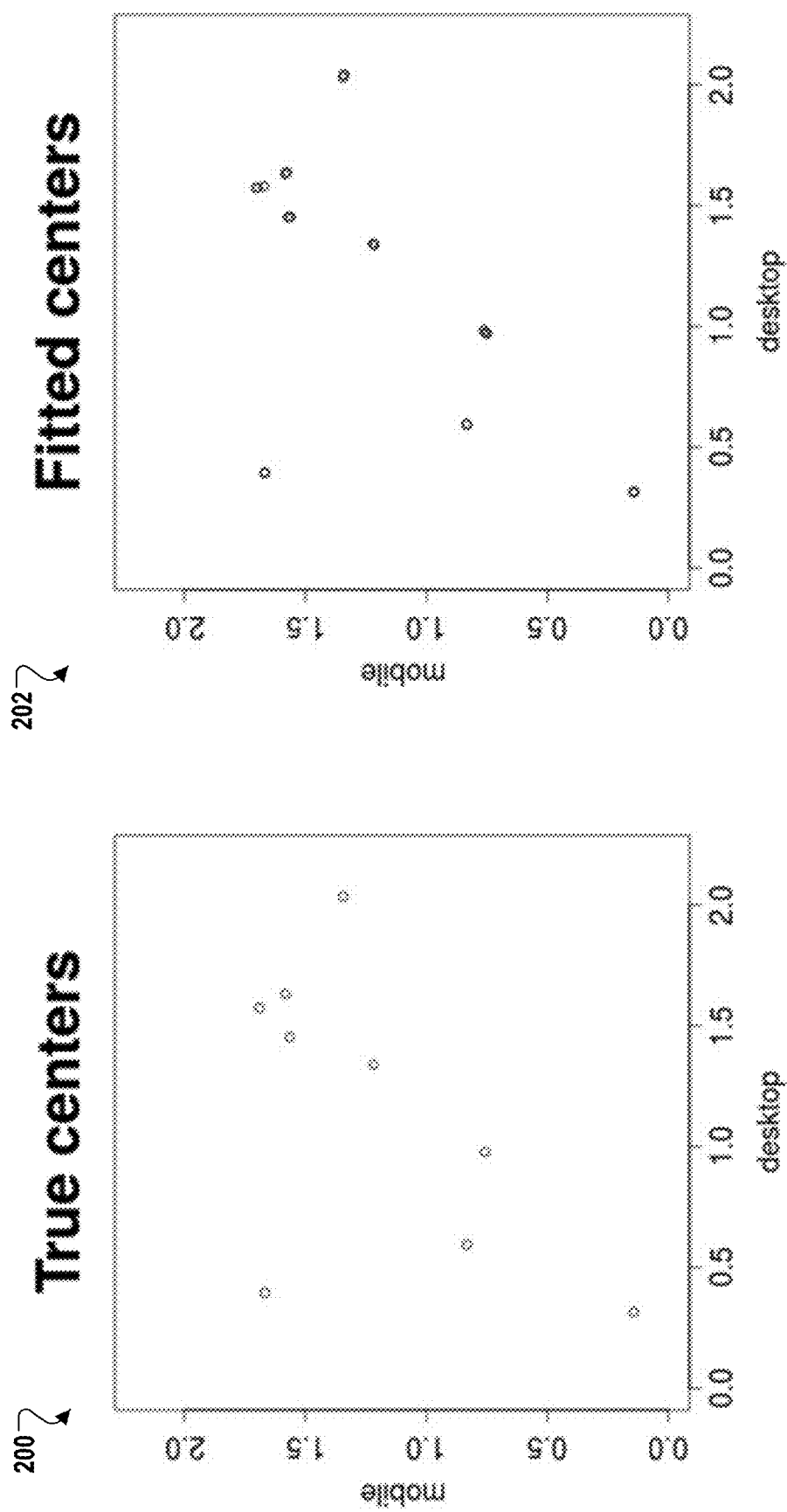
FIG. 2A shows example locations of an Activity Distribution Function (ADF) Dirac Mixture and the result of fitting to the simulated training data.

In a first example, an ADF can be constructed using nine Dirac mixtures located at random positions all with equal weights ($\alpha_k = \frac{1}{9}$). The I=2,000 campaigns can be randomly generated and then used to estimate the ADF. The algorithm can be initialized with one Dirac, and the algorithm can converge with nine clusters of Diracs, each with a weight very close to $\frac{1}{9}$ and with locations indistinguishable from the original ADF. FIG. 2A shows example locations 200 of the ADF Dirac Mixture and the result 202 of fitting to the simulated training data for mobile devices and desktop devices.

In a second example, the number of cookie types can be increased to three, and a continuous ADF can be used, specifically a trivariate Gaussian distribution with the mean of (0.7, 0.8, 1.0)' and a covariance matrix (Matrix 17a):

$$\begin{pmatrix} 0.1, & 0.1, & 0.0 \\ 0.1, & 0.2, & 0.0 \\ 0.0, & 0.0, & 0.3 \end{pmatrix} \quad (17a)$$

For this ADF, analytically solving Equation 9, may be impossible, and instead a Monte-Carlo integration can be used, specifically in the form of (Equation 18):

$$R(t) = \int_{x \in \mathbb{R}^+} \mathcal{A}(x) \cdot (1 - e^{-tx}) dx = \sum_{x_i \in Sample(\mathcal{A})} (1 - e^{-tx_i}) \quad (18)$$

where $Sample(\mathcal{A})$ is a sample of $|Sample(\mathcal{A})|$ points from the distribution $\mathcal{A}$. The simulations can use 1,000 points. This integration can reduce the continuous distribution to a Dirac mixture. Since the difference in estimated reach surfaces using different large samples is very small, the ADM algorithm does not necessarily converge to the exact sample, but rather to some other configuration that approximates the underlying continuous ADF.

Figure 2B:
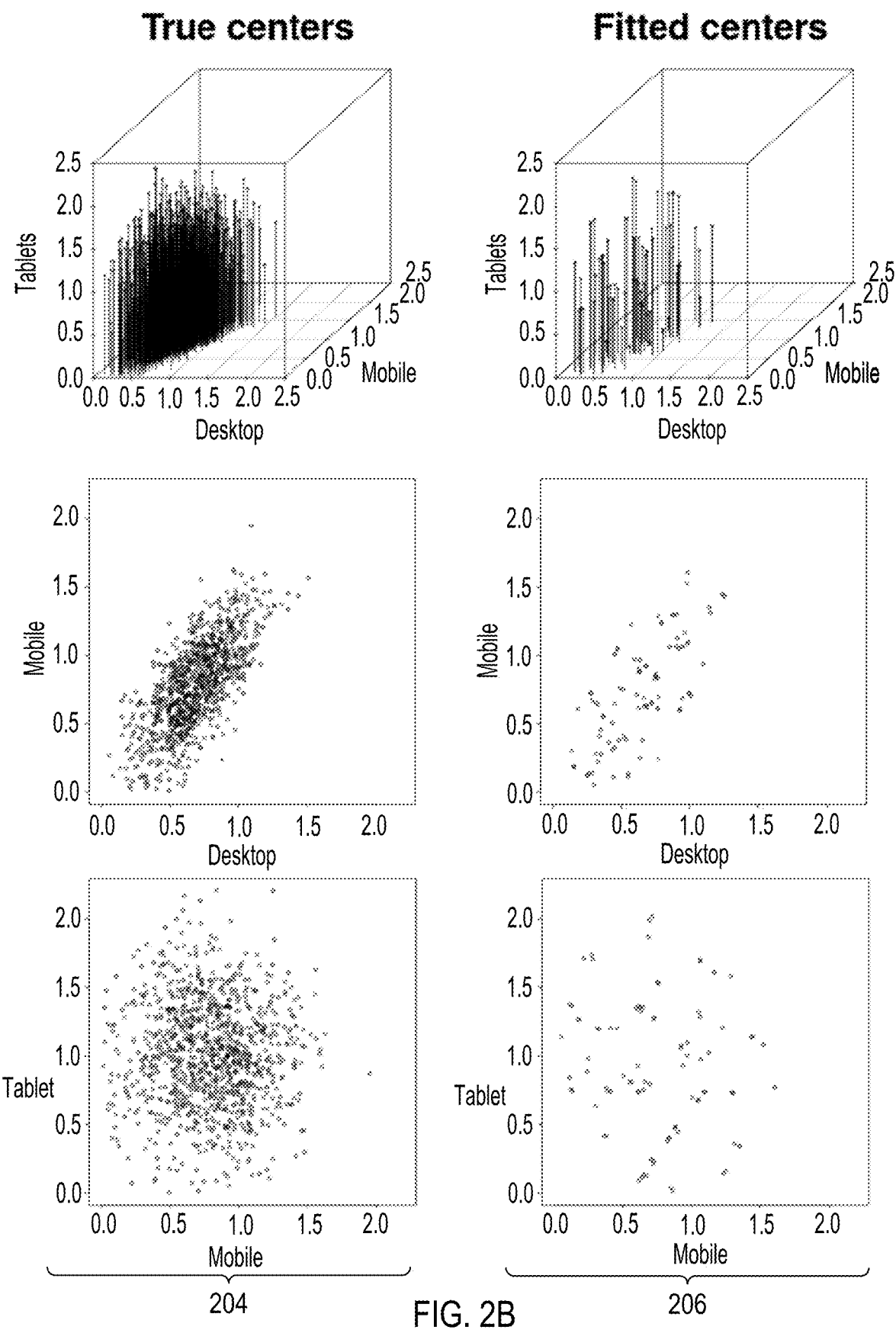
FIG. 2B shows example locations of the ADF Dirac Mixture and the result of fitting to the simulated training data corresponding to a 3-dimensional Gaussian ADF.

FIG. 2B shows example locations 204 of the ADF Dirac Mixture and the result 206 of fitting to the simulated training data corresponding to a 3-dimensional Gaussian ADF. As shown in FIG. 2B, the Sample($\mathcal{A}$) is shown as example locations 204, and the estimated ADF using the ADM algorithm is shown as a result 206. In this example, I is increased to 3,000. The top row shows the three-dimensional centers of the ADFs, while the middle and bottom rows show two-dimensional scatterplots. The estimated ADF has a mean (0.711, 0.818, 1.003) which is within three digits of the average from Sample($\mathcal{A}$). The estimated ADF has covariance matrix (Matrix 18a):

$$\begin{pmatrix} 0.092, & 0.089, & -0.001 \\ 0.089, & 0.184, & -0.003 \\ -0.001, & -0.003, & 0.334 \end{pmatrix} \quad (18a)$$

which is within two digits of the covariance matrix from Sample($\mathcal{A}$). Hence the majority of the error is introduced by using Monte-Carlo integration rather than from the ADM algorithm.

Figure 3:
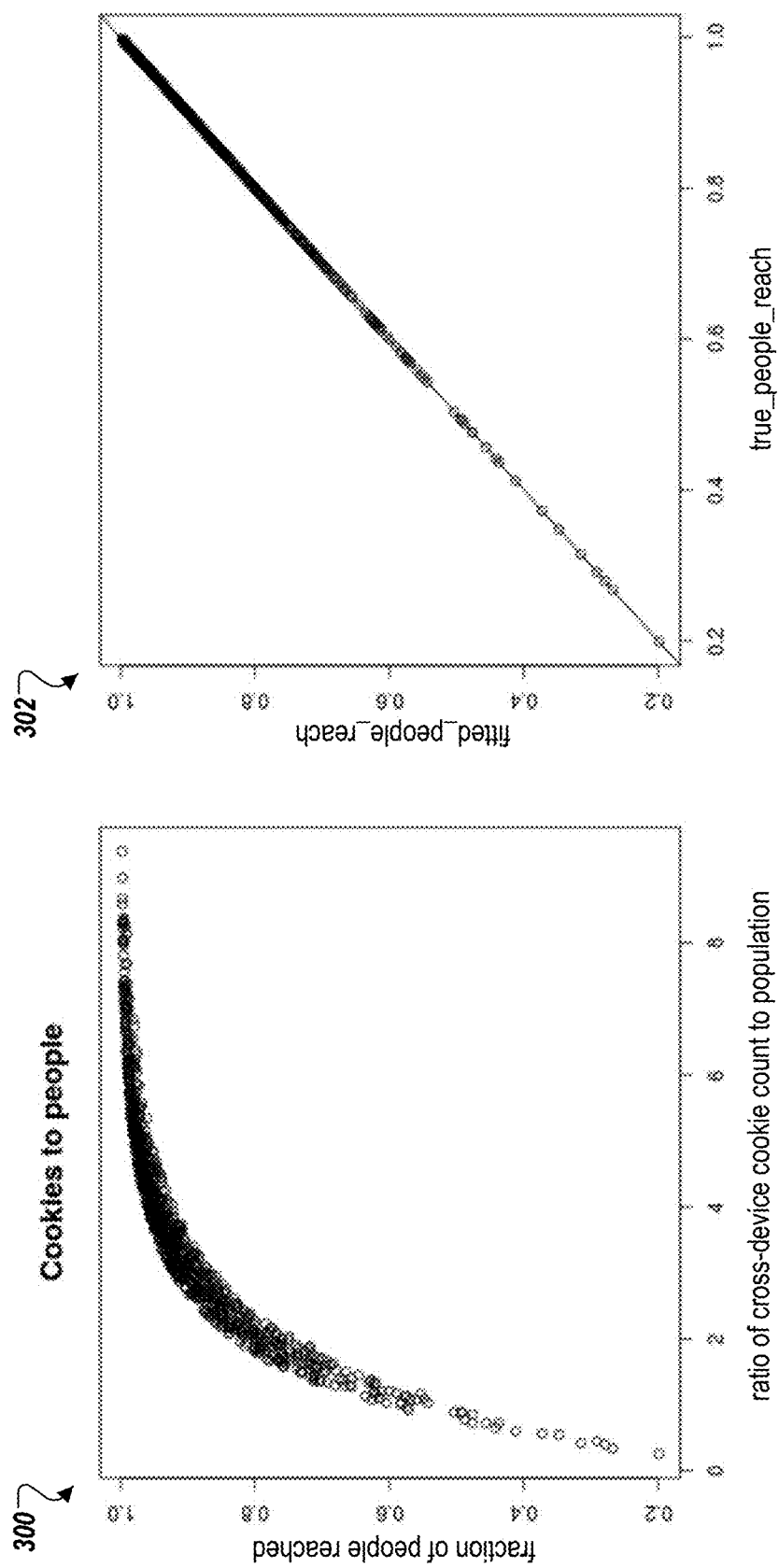
FIG. 3 shows example cookies-to-people and truth-to-estimate charts for a simulated 3-dimensional normal ADF.

Another aspect to consider is how well the reach surface is constructed, as this is the ultimate use of this method. FIG. 3 shows example cookies-to-people and truth-to-estimate charts for simulated 3-dimensional normal ADF. For example, graph 300 in FIG. 3 shows a scatterplot of $\hat{R}$ vs. $c_i$ for the I campaigns, and graph 302 shows an estimate reach $\hat{R}$ vs. the truth ($R_i$) on the right. This example shows that the model almost exactly estimates the true reach surface.

In a third example, ADF is made more complicated by taking a 50/50 mixture of trivariate Gaussian distributions. The first distribution is the same as in Example 2, while the second distribution has mean (1.5, 0.5, 0.5) and covariance matrix (Matrix 18b):

$$\begin{pmatrix} 0.1, & -0.1, & 0.0 \\ -0.1, & 0.2, & 0.0 \\ 0.0, & 0.0, & 0.3 \end{pmatrix} \quad (18b)$$

Figure 4:
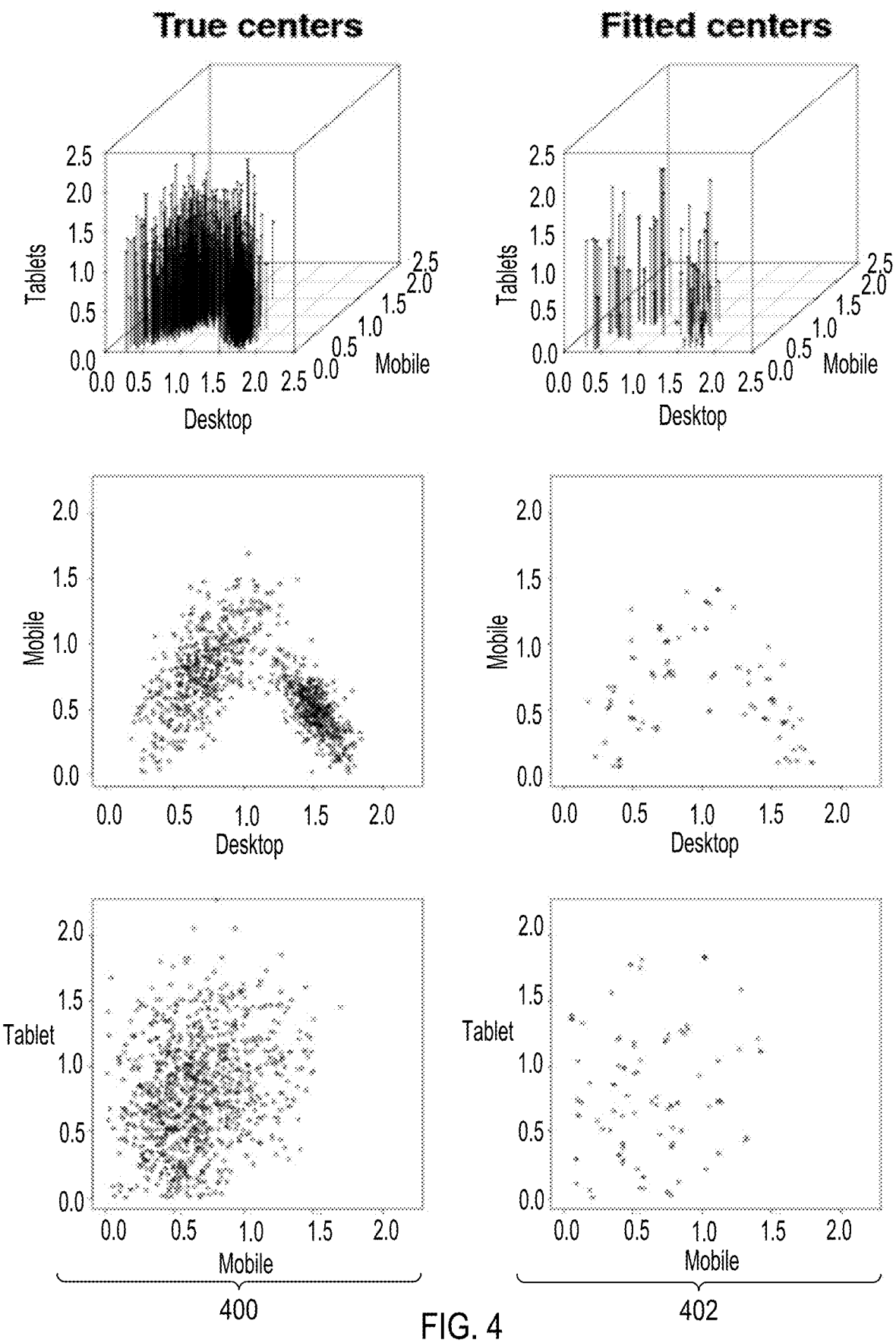
FIG. 4 shows example of the ADF Dirac Mixture and the result of fitting to the simulated training data.

FIG. 4 shows an example of the ADF Dirac Mixture and the result of fitting to the simulated training data. For example, graphs 402 in FIG. 4 shows the result of fitting the ADF Dirac Mixture to data in graphs 400 as analogous to FIG. 2B. Again, the ADF is reconstructed to be closer to Sample($\mathcal{A}$), and the reach surface estimates are reconstructed almost exactly (not shown but similar to FIG. 3).

These examples can demonstrate that the ADM algorithm, with an appropriate amount of training data and starting from centers sampled uniformly at random from a cube of an appropriate dimension, can closely approximate reasonably complex ADFs and their associated reach surfaces.

Figure 5:
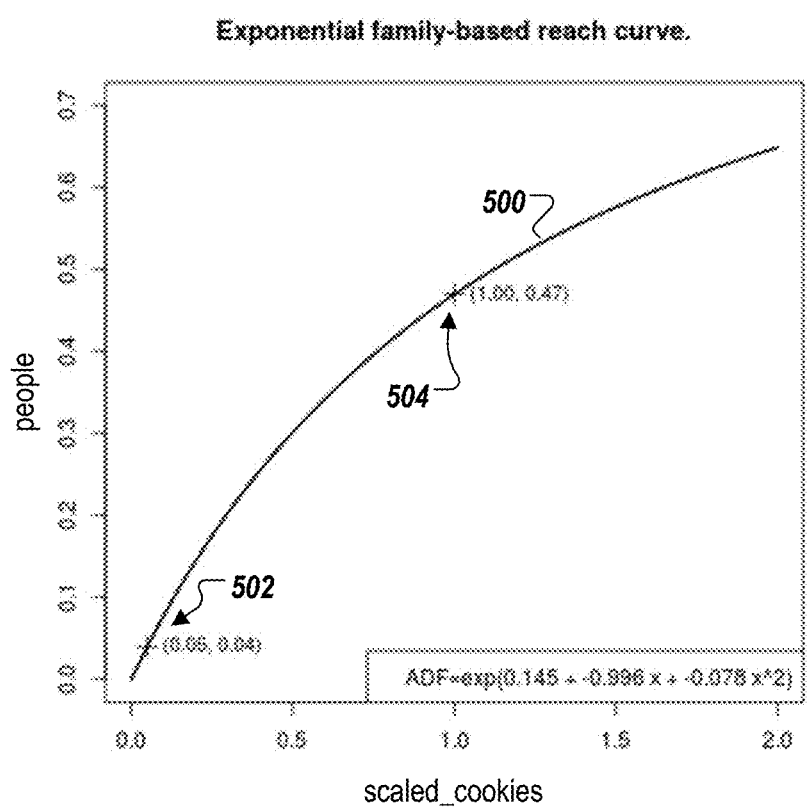
FIG. 5 shows an example generalized exponential family-based curve.

As discussed above with regards to generalizing the exponential ADF, gradient descent can be used to estimate parameters of a generalized exponential distribution. Since the estimations involve computationally expensive numeric integration at each step, a very few pre-computed reach curve points can be used. For instance, the points can be obtained from counts of cookies and people for weekly and monthly audiences of the network in question. FIG. 5 shows an example generalized exponential family-based curve 500. The curve is fit using a gradient descent to pass through two points: point 502 (0.05, 0.04) and point 504 (1.0, 0.47).

EXAMPLES

The following section illustrates example methods using desktop and smartphone campaigns by the various content serving channels. First, the panel and the PPD available in the content server logs are described. Then, performance of the cookie-correction models for both desktop and smartphone are described, and results for the cross-device cookie-to-user models are shown.

Figure 6:
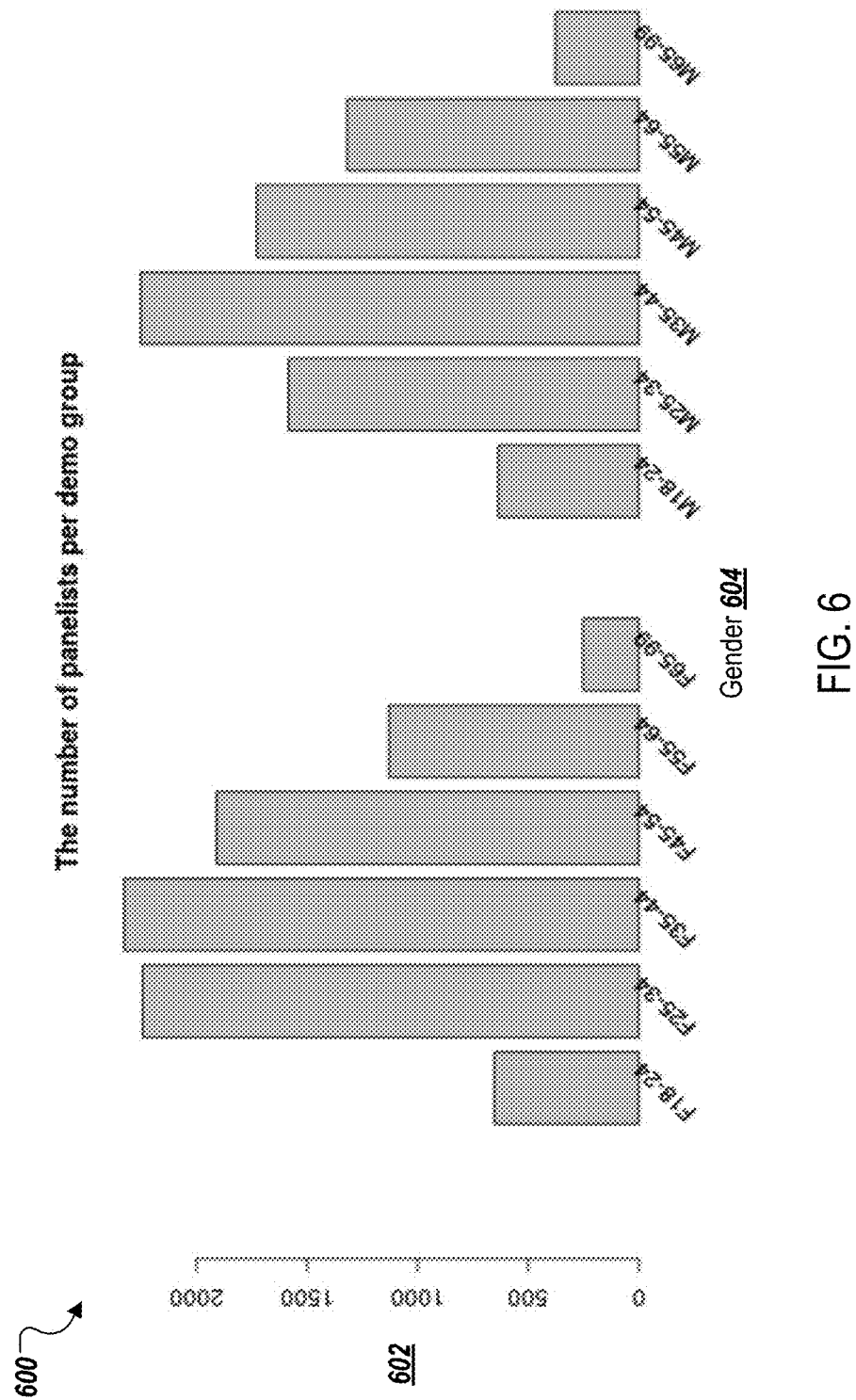
FIG. 6 is a graph showing an example number of panelists by gender and age demographic groups.

The panel data includes panelist weights that were calibrated to population benchmarks derived from a population census. FIG. 6 is a graph 600 showing an example number of panelists 602 by gender and age demographic groups 604.

Figure 7:
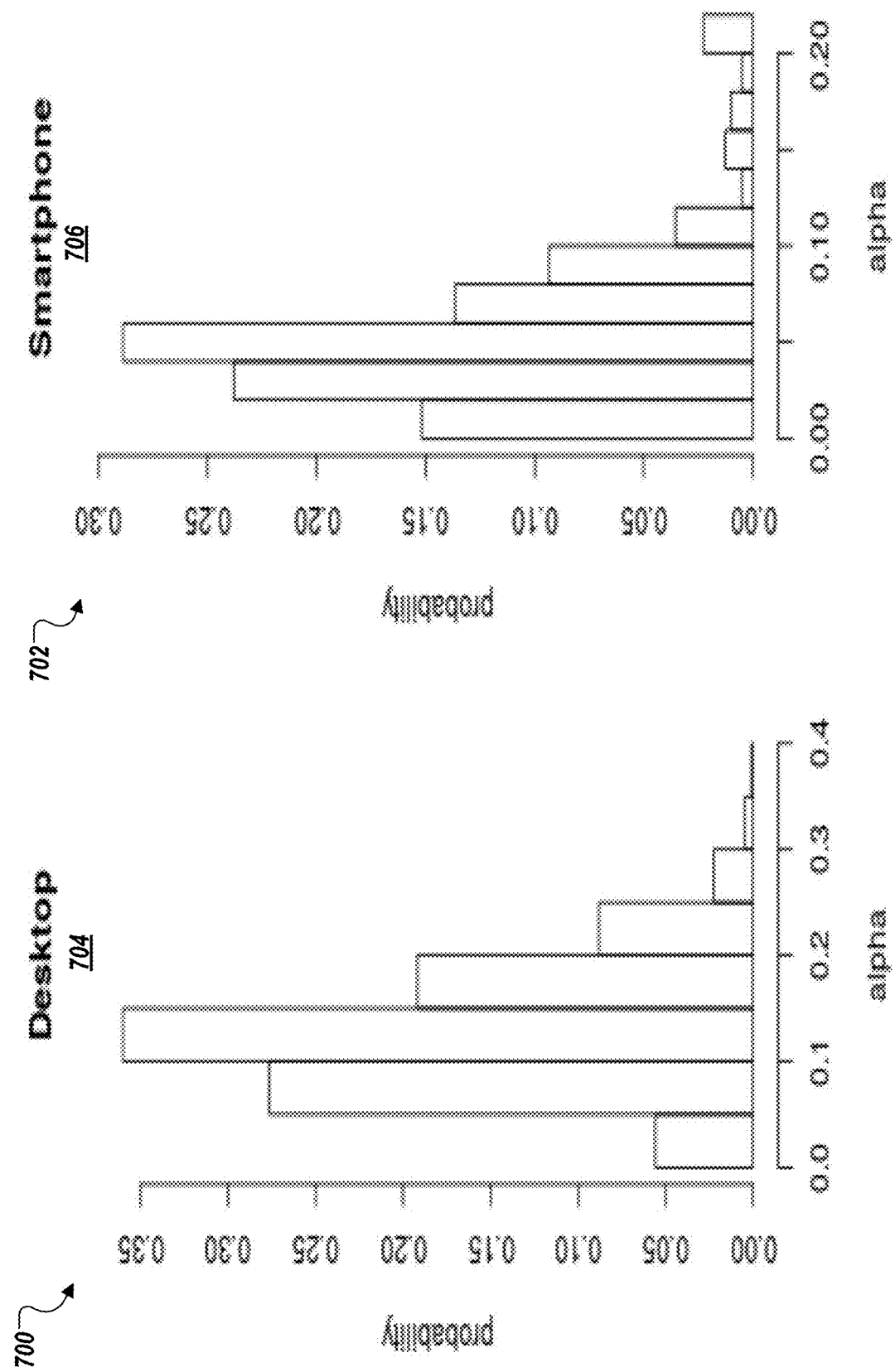
FIG. 7 shows an example distribution of cookie proportions with PPD labels across campaigns, split by device.

Content serving events were collected for campaigns together with their cookies and, when available, their video sharing site declared labels (e.g., provided by users when they create their accounts). Such labels were merged with content events for logged-in users. FIG. 7 shows an example distribution of cookie proportions with PPD labels across campaigns, split by device. For example, FIG. 7 shows the histograms 700 and 702 of $\alpha_{ij}$, including the fraction of cookies that had video-sharing site declared labels in a campaign for desktop 704 and smartphone 706, respectively.

A correction was made for cookies by device. For example, the correction can be based on using the root mean squared error (RSME) for measuring the goodness of fit of a model. A shuffle distance was introduced as an additional metric to gain better interpretation and insight of the performance of the model's ability to estimate context decompositions. The shuffle distance is very similar to an edit distance, measuring a difference between two proportion vectors by computing the minimum fraction that needs to be re-labeled to achieve an exact match. The shuffle distance is defined as (Equation 19):

$$\text{shuffle}_j = \frac{\|y_{ij} - \hat{y}_{ij}\|_1}{2} \quad (19)$$

where $y_{ij}$ represents the context proportion of cookies observed from panel data for campaign i and device j, and is regarded as ground truth for training, with the $\hat{y}_{ij}$ term representing the model estimate (Equations 5a, 5b).

The "Context Correction Model" section above describes the methodology for training per device cookie-correction models for both impressions and cookies. The redistribution matrix $B_j$, where j indexes the device, represents the probability of a true context of a cookie given its observed video-sharing site label. The redistribution matrix can be computed directly by counting weighted (using associated panelists weights) cookies by their true context (rows) and video-sharing site labels (columns) and then normalizing by column. The correction matrix $A_j$ can be trained by campaigns using cookies from device j. For these models, training campaigns can be based on at least 100 panelists being reached for the desktop (or smartphone) models, and unconstrained linear regression can be used.

Table 1 shows example cross-device people reach performance for the independence model and the Dirac mixture model. The relative difference can be defined as the absolute difference between the ground truth (e.g., reach observed from panel data) and the estimated reach from the model divided by the ground truth. The values % within 10 and % within 20 are the fraction of campaigns whose relative differences to their ground truths are less than 10% and 20%, respectively.

TABLE 1

Cross-device People Reach Performance

|  | # Campaigns | Average Relative Difference | % within 10 | % within 20 |
| --- | --- | --- | --- | --- |
| Independence Model | 596 | 0.057 | 88.6% | 96.6% |
| Dirac Mixture Model | 596 | 0.053 | 88.1% | 96.6% |

Table 2 shows example estimated parameters of the Dirac mixture model using the ADM algorithm. The table shows three Dirac deltas as columns. Each Dirac delta is parameterized by weight ($\alpha$), desktop activity, and smartphone activity.

TABLE 2

Estimated Parameters of Dirac Mixture Model

| Dirac Delta Index | 1 | 2 | 3 |
| --- | --- | --- | --- |
| Weight ($\alpha$) | 0.106 | 0.470 | 0.424 |
| Desktop ($x_{j1}$) | 0.00 | 0.922 | 1.10 |
| Smartphone ($x_{j2}$) | 4.64 | 1.28 | 0.00 |

Figure 8:
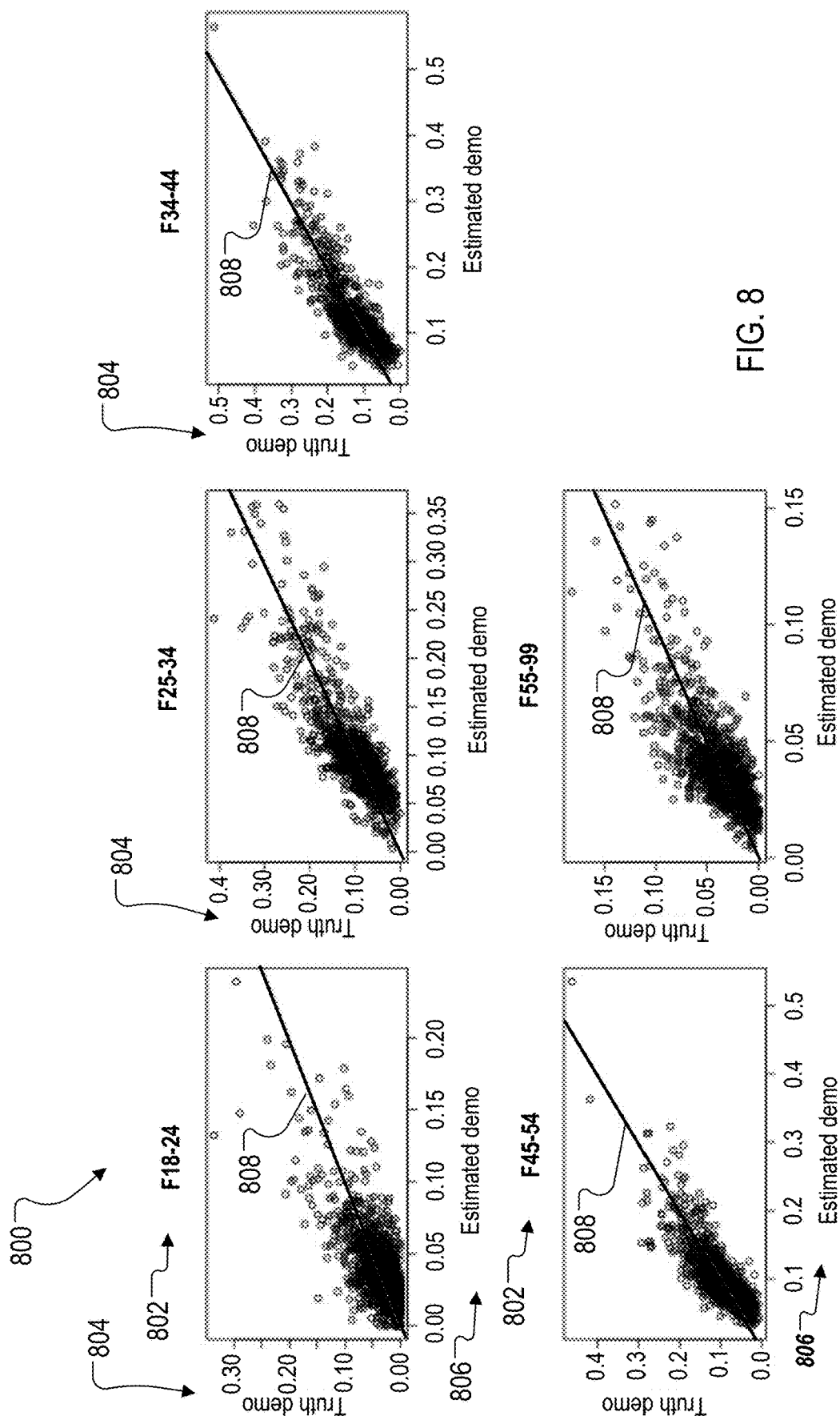
FIGS. 8 and 9 show the demographic proportion comparison for cookies between the "panel" ground truth (y-axis) and the estimate (x-axis) for each demographic group for desktop and smartphone, respectively.
Figure 8:
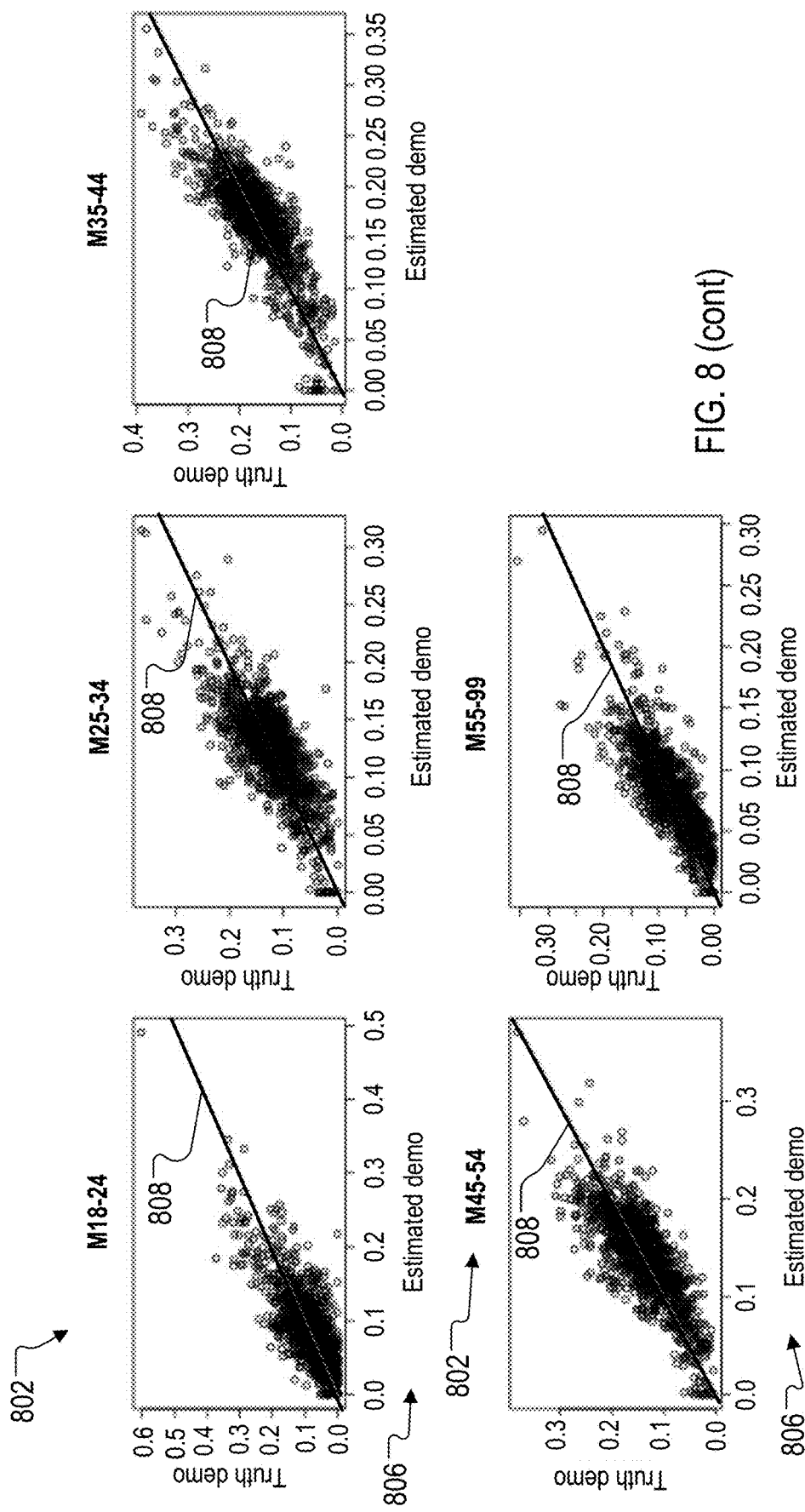
Figure 9:
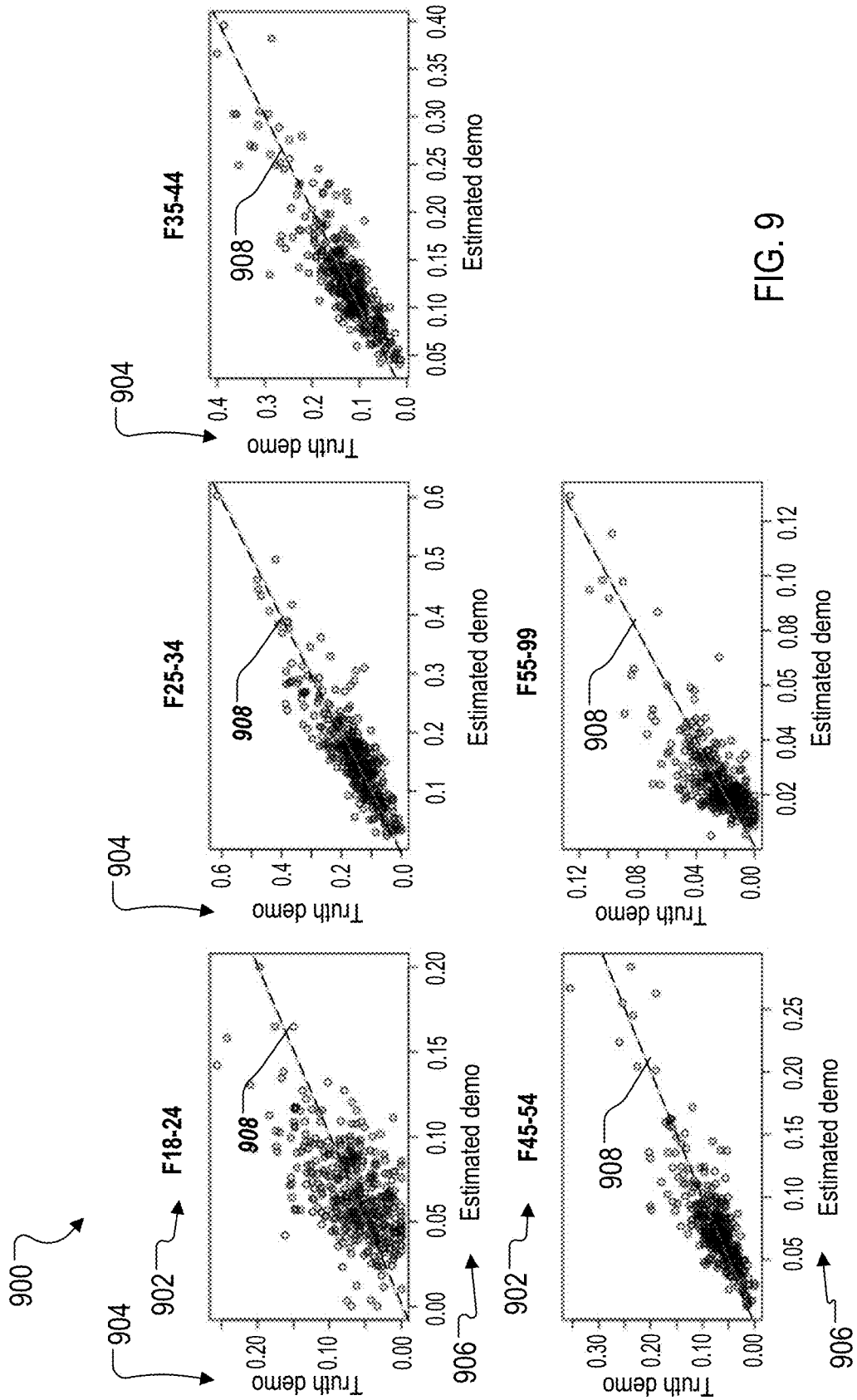
Figure 9:
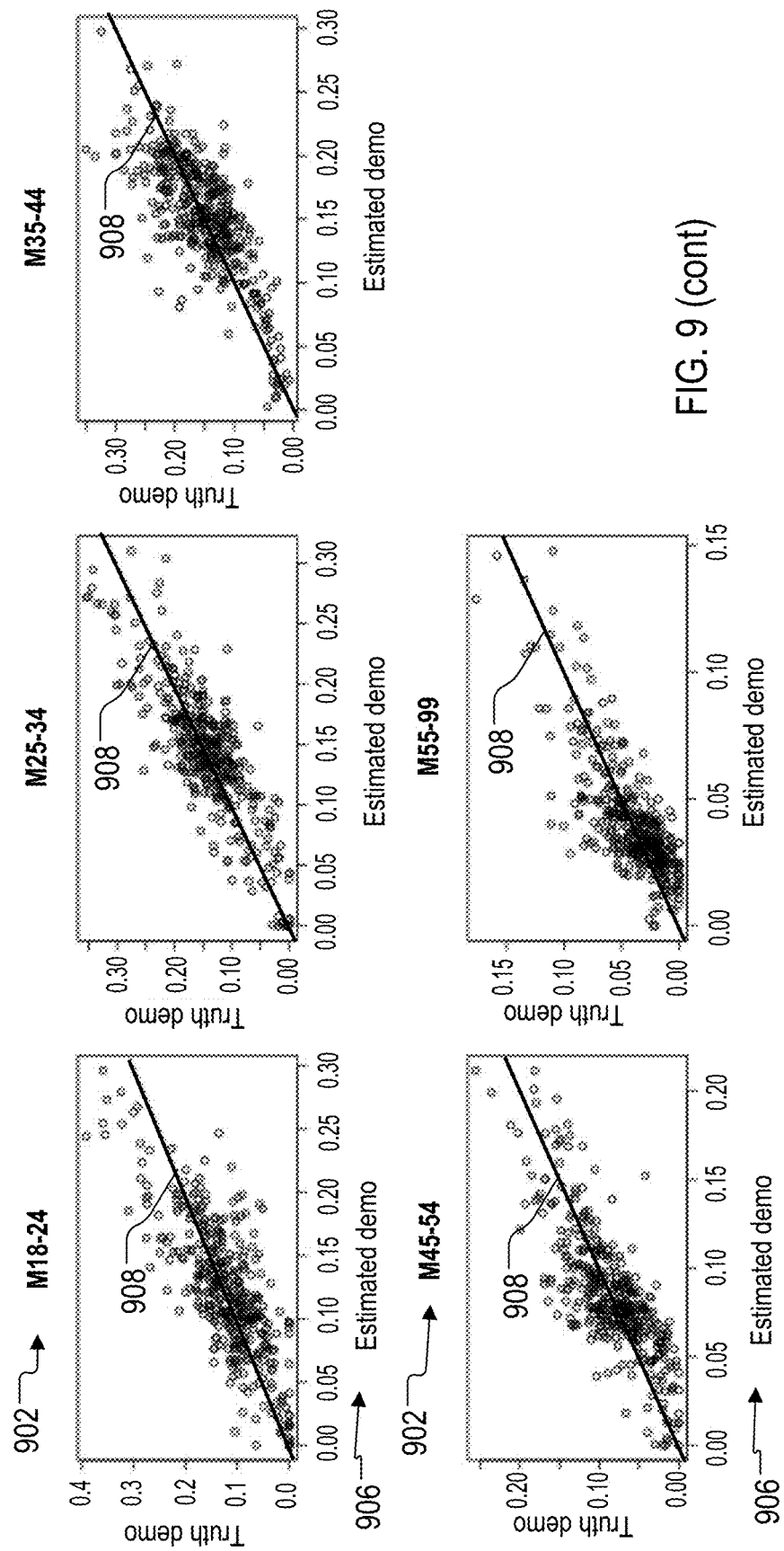

FIGS. 8 and 9 show the demographic proportion comparison for cookies between the "panel" ground truth (y-axis) and the estimate (x-axis) for each demographic group for desktop and smartphone, respectively. For example, FIG. 8 includes scatter plots 800 showing an example demographic performance of desktop cookie correction model. For each demographic group 802, the respective scatter plot 800 compares the proportion of cookies in a campaign observed from panel data 804 (truth demographic in y-axis) to that estimated based on the group-based model 806 (estimated demographic in x-axis). Dashed lines 808 are the identity lines. FIG. 9 includes scatter plots 900 showing an example demographic performance of smartphone cookie correction model. For each demographic group 902, the respective scatter plot 900 compares the proportion of cookies in a campaign observed from panel data 904 (truth demographic in y-axis) to that estimated based on the group-based model 906 (estimated demographic in x-axis). Dashed lines 908 are the identity lines. These plots show that the model fits the training campaigns reasonably well for both desktop and smartphone.

The previous section evaluates the per device cookie-correction model. This section evaluates the cross-device cookie-to-user models for the independence model as described above (in the discussion of multiple device reach curves via an independence assumption) and the Dirac mixture model as described above in the section that describes multiple device reach curves via activity-distribution functions.

Following the methodology presented above in the discussion of multiple device reach curves via an independence assumption, the Bow models can be trained for desktop and smartphone, separately. The Bow models can estimate people reached by cookies from a single device. Per device reach can then be de-duped through the independence assumption (Equation 6).

The Dirac Bow model fits the training data better than the exponential Bow model for both devices. The fitted kappas are 0.92 and 1.00 for desktop and smartphone, respectively. As expected, the desktop model has a lower kappa, as a person has more desktop cookies (because of higher chance of cookie churn and multiple browsers) than smartphone cookies.

Figure 10:
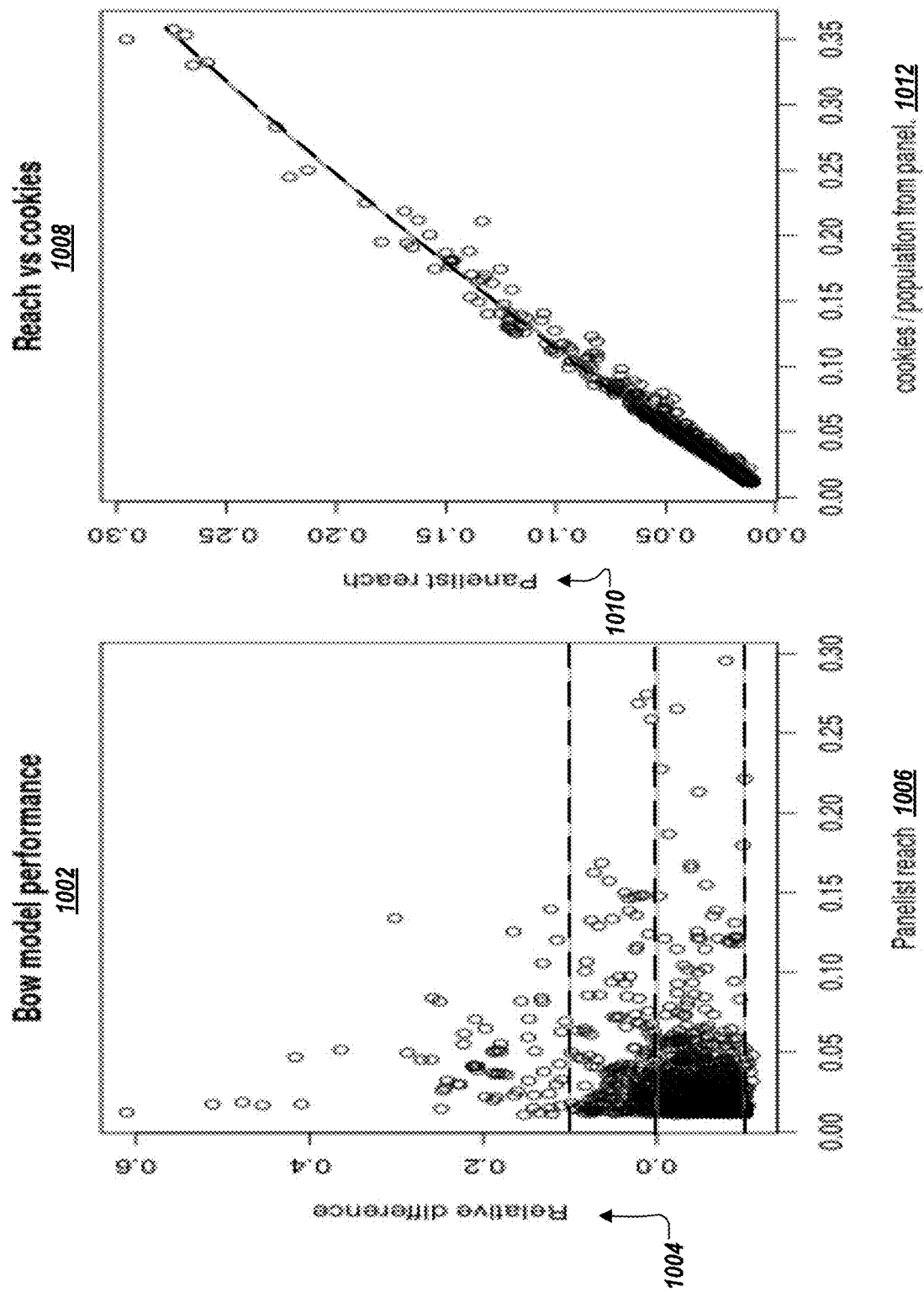
FIGS. 10 and 11 show per device reach results for desktop and smartphone, respectively.
Figure 11:
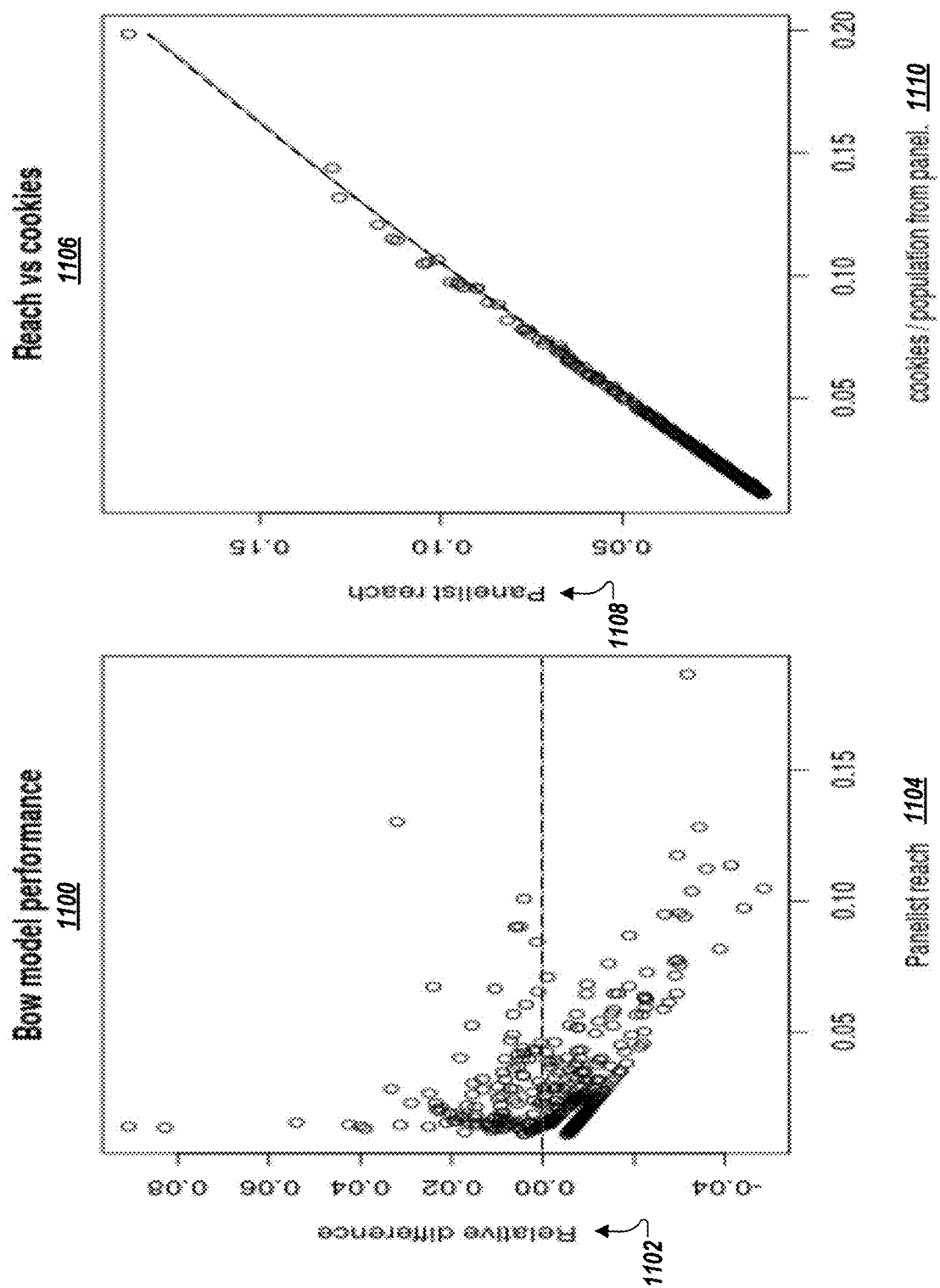

FIGS. 10 and 11 show per device reach results for desktop and smartphone, respectively. For example, FIG. 10 shows an example performance of the Bow model (cookies-to-people) for desktop. The trained Bow model takes the uniform Bow model with kappa=0.903. Plot 1002 shows the relative difference between truth 1004 (observed reach from panel data) and estimate 1006 in y-axis vs. truth in x-axis for campaigns. The horizontal lines mark +/−10% relative differences. Plot 1008 shows the (panel and estimated) people reach 1010 (i.e., the number of people reached by a campaign divided by the total population) vs. the normalized cookies 1012 (i.e., the number of cookies divided by total population) observed from panel data. The circle represents the truth reach for a campaign. The smoothed line is the reach prediction by the respective Bow model.

FIG. 11 shows an example performance scatter plot 1100 of the Bow model for smartphone. The trained Bow takes uniform Bow model with kappa=1. For example, the performance scatter plot 1100 plots a relative difference in performance 1102 relative to a panelist reach 1104. Overall, the model reach estimates match the panel estimates very closely. The smartphone model shows a close one-for-one matching of cookies to people. A reach vs. cookies scatter plot 1106 shows a relationship between a panelist reach 1108 and a ratio of cookies to a panel population 1110.

To evaluate the cross-device reach model using the independence assumption, the focus can be on cross-device campaigns that have reached at least 100 panelists from desktop and at least 100 panelists from smartphone. The performance can be evaluated for both cross-device people context decomposition and cross-device people reach.

Figure 12:
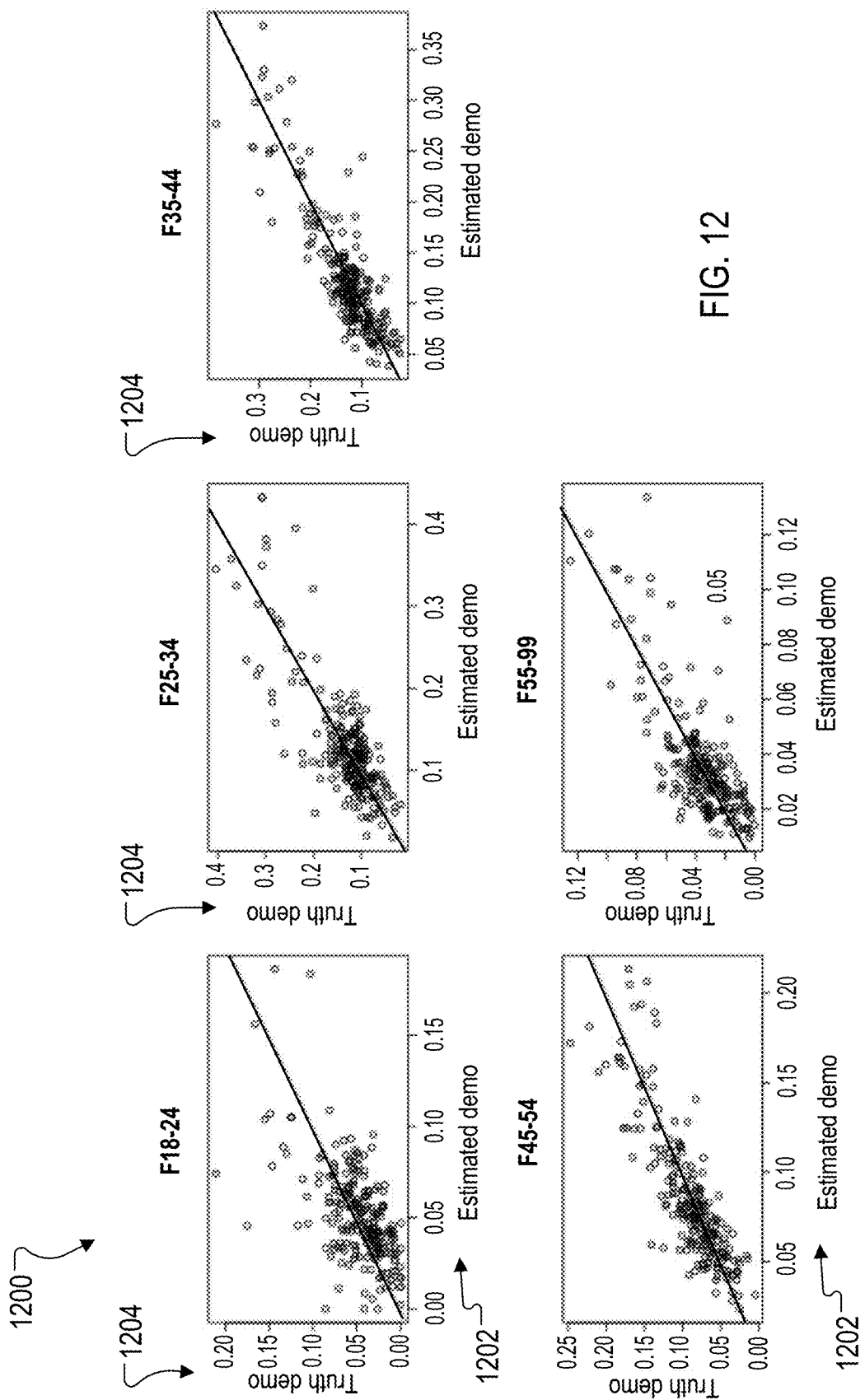
FIG. 12 shows an example performance of independence cross-device model for people demographic proportion by demographic group.
Figure 12:
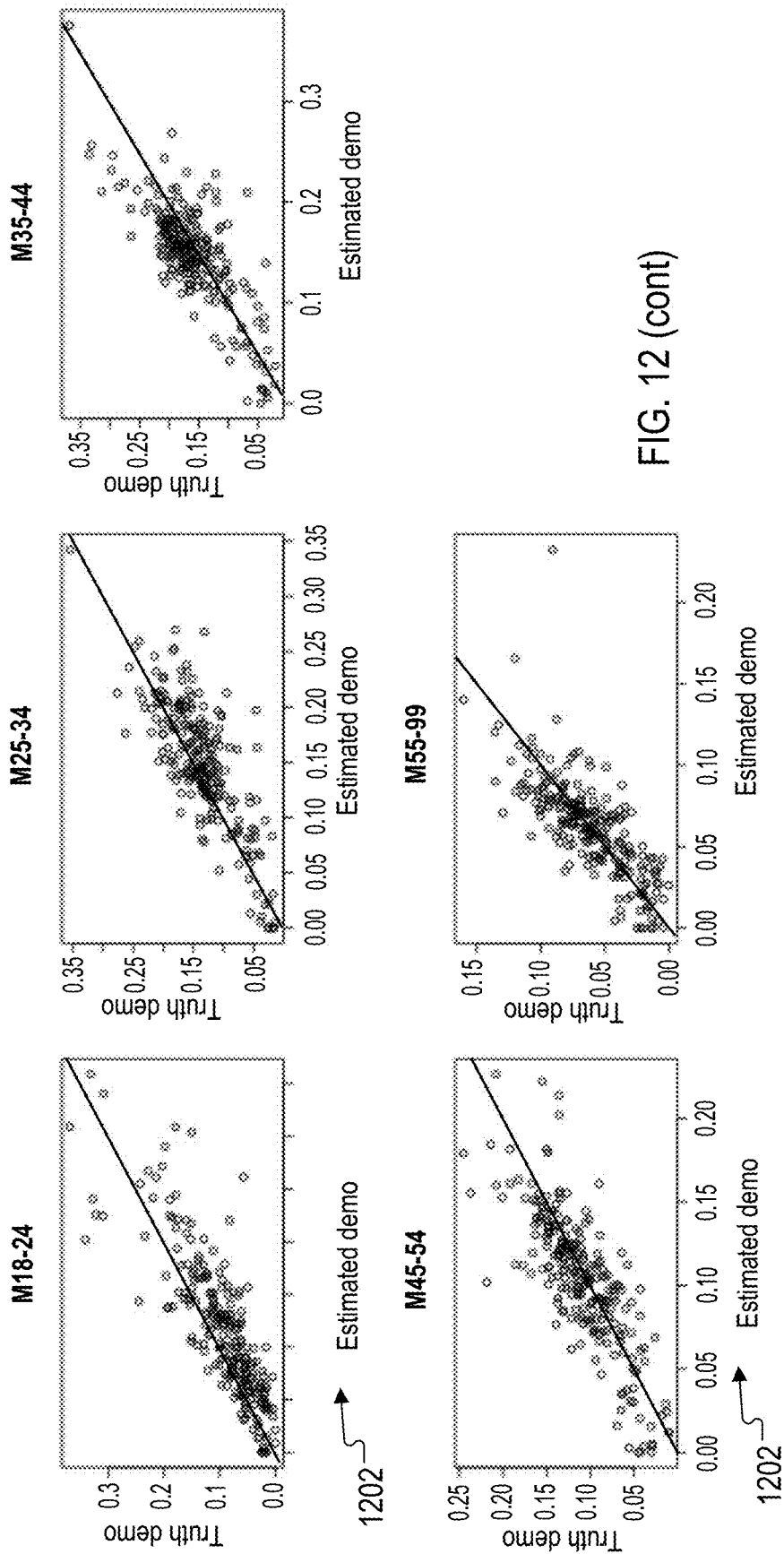

FIG. 12 includes scatter plots 1200 showing an example performance of independence cross-device model for people demographic proportion by demographic group. For example, FIG. 12 shows detailed comparisons of the cross-device people demographic proportions between the model estimates 1202 and the panel ground truth 1204.

The first row in Table 1 shows the summary performance of cross-device people reach for the independence model. The cross-device reach estimates are within 10% of the panel estimates for 88.6% of campaigns.

Figure 13:
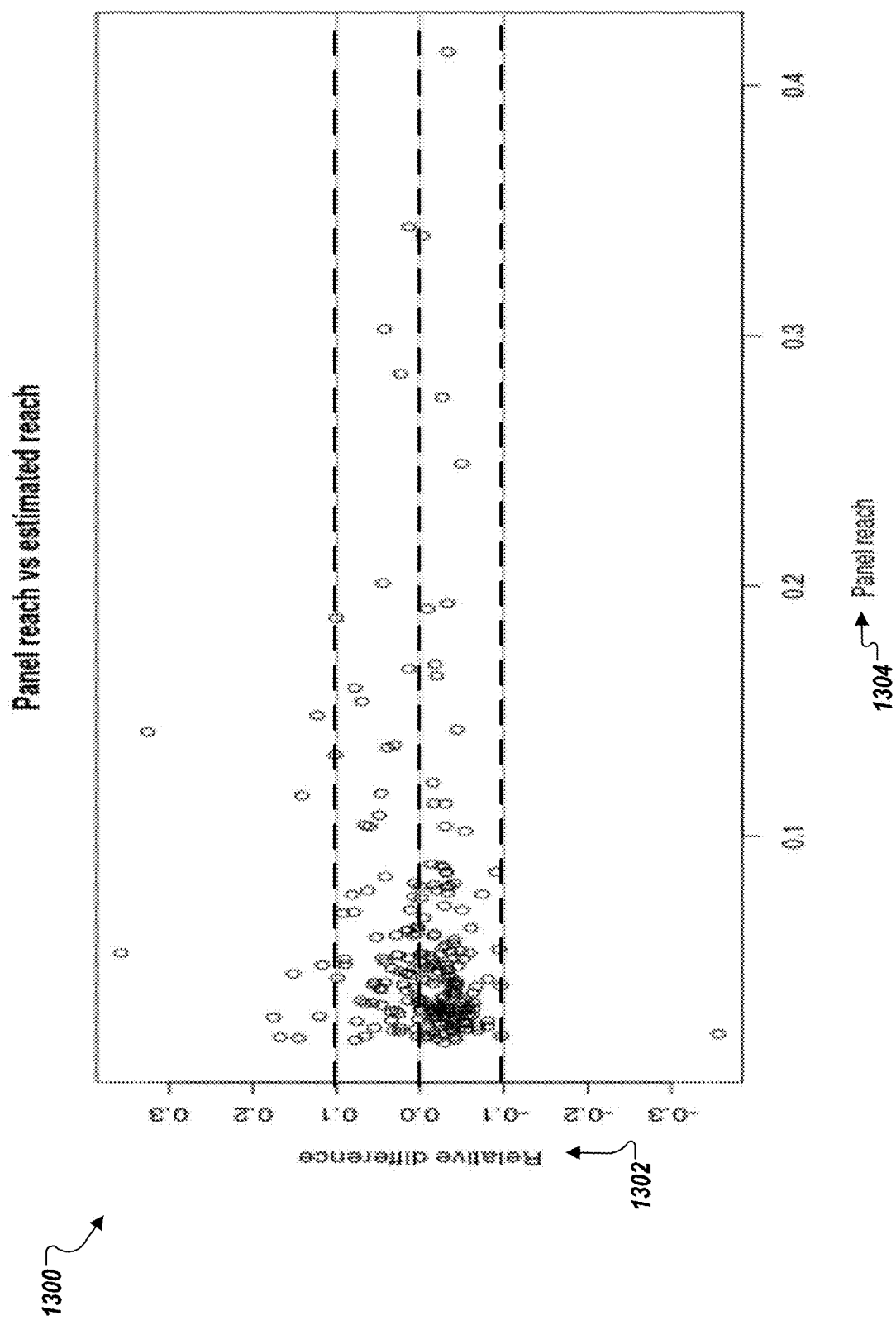
FIG. 13 shows an example performance of people reach for the independence cross-device model.

FIG. 13 shows an example performance 1300 of people reach for the independence cross-device model. For example, FIG. 13 shows the relative difference 1302 between truth (observed reach from panel data 1304) and its estimate vs. truth.

In summary, the independence cross-device cookie-to-user model performs well for estimating both the context proportions and total reach.

The Dirac mixture model (described above in the section that describes multiple device reach curves via activity-distribution functions) was trained by the ADM algorithm. The fitted model has three Dirac delta functions (see parameters in Table 2). The first Dirac delta represents people who have only smartphone devices (estimated at 10.6%), the second Dirac delta represents people who have both desktop and smartphone devices (estimated at 47.0%), and the third Dirac delta represents people who have only desktop devices (estimated at 42.4%). While the properties of the Dirac mixtures are interesting, they are ultimately a means to estimate the reach surface and hence should not be over-interpreted.

The cross-device row in Table 1 shows the summary performance for cross-device context estimates. The % within 20 is 90.9%, which is slightly better than the independence model (e.g., 91.3%), although all metrics are very close between the two models.

The second row in Table 2 shows the summary performance of cross-device people reach using the Dirac mixture model. The cross-device reach estimates are within 10% of the panel estimates for 88.1% of campaigns. FIG. 13 shows the reach performance by campaigns for the Dirac mixture model. Again, it has very similar results as the independence model.

Generalized methodologies can be developed for measuring the reach and frequency of online audiences with context breakdowns. The methodologies can handle cross-device audiences and combinations of cookie types, and therefore can measure both signed-in and signed-out users. The methodologies can calibrate content server logs and PPD using a smaller high-quality panel that is itself calibrated to census benchmarks. To measure cross-device audiences, an Activity Distribution Function can be introduced that models the joint cookie ownership distribution across a population. Algorithms can be included for fitting the ADF and provided simulation results demonstrating that the methodologies provide accurate results given enough training data from the calibration panel.

The methodologies were demonstrated using the panel data, fitting two reach models: a first model that assumes that campaigns reach desktop and smartphone users independently, and a second model using the Dirac mixture model and fit using the ADM algorithm.

Both models fit the campaign data well with over 90% of campaigns within 20% shuffle distance for context breakdowns and over 88% of campaigns within 10% for reach. In some situations, the Dirac mixture model, with its added flexibility, fits slightly better and provides a more generalized solution.

Building a cross-device reach surface via independence assumption just needs to fit reach marginals. The Exponential Bow and Dirac Bow models can use two coefficients: κ and the maximum population estimate P. For the population limit, the internet population that is usually available from census data can be used, and hence the models only have one parameter to estimate. When fitting to panel data, it is reasonable to set P to be the total number of panelists.

The Intuitive interpretation of the κ parameter is the number of people per cookie in small audiences. Estimating κ via quantile regression can be done by selecting the median κ going through points of the training data, in which κ can be set to be an empty array.

As it was mentioned above, when a collection of locations of delta functions exists, then the Dirac Mixture can be fit using least squares. Then $[x_1^0, \ldots, x_n^0]$ can be defined as a matrix composed of vectors $x_1^0, \ldots, x_n^0$ as its columns.

If the dimensionality (e.g., number of devices) of a model is low (such as 1 or 2), then the activity space can be covered by a grid of reasonably high precision, and Algorithm 3 can be used to find weights (α's) of the delta functions located on the grid. As the dimensionality increases above two, the size of a grid with reasonable resolution becomes prohibitively high. For instance, in four dimensions, a grid of 10 points in each dimension has 10,000 points. For this situation, the Adaptive Dirac Mixture algorithm is better. The algorithm tries to locate the number of delta functions, their optimal positions, and associated weights.

Figure 14:
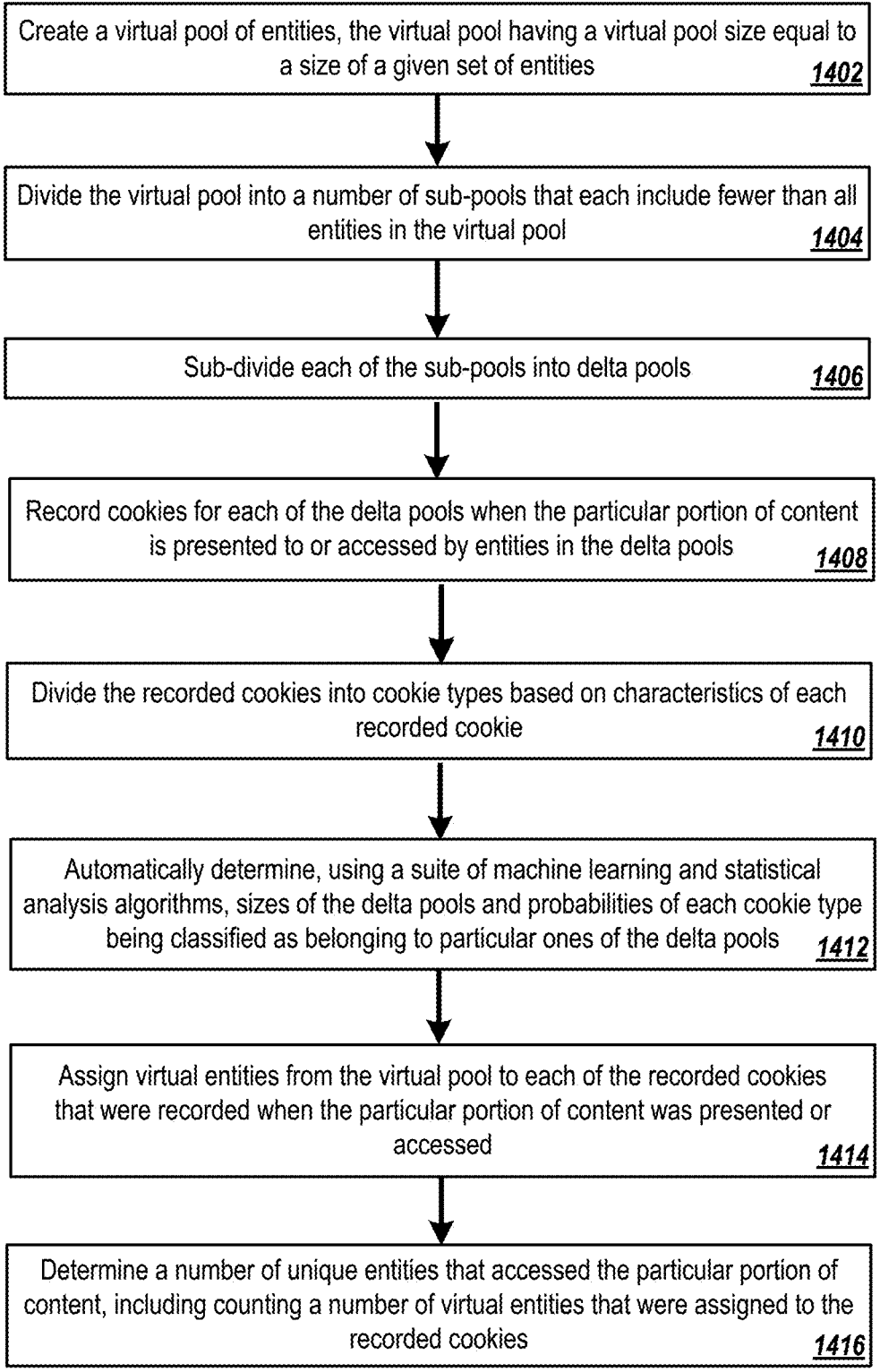
FIG. 14 is a flowchart of an example process for determining a number of unique individuals exposed to or accessing a particular portion of content.

FIG. 14 is a flowchart of an example process 1400 for determining a number of unique individuals exposed to or accessing a particular portion of content. In some implementations, the third-party content distribution system 110 and components that it includes can perform operations of the process 1400. In some implementations, operations of the process 1400 can be implemented by one or more servers and a memory device storing instructions that are executed by one or more servers. Operations of the process 1400 can also be implemented using computer-readable instructions that are stored on a non-transitory computer readable medium, such that when the instructions are executed by one or more computing devices (e.g., servers), the instructions cause the one or more computing devices to perform operations of the process 1400. The process 1400 is described with reference to FIGS. 1-13 in order to identify example structures for performing the operations of the process 1400. Further, Equations 1-19 can be used as a basis for counting the unique individuals.

A virtual pool of entities is created that has a virtual pool size equal to a size of a given set of entities (1402). For example, the third-party content distribution system 110 can count user devices 106 (or individuals using the devices, or for which user cookies have been generated) that have made requests 112 and received replies 120 and/or have made third-party requests 121 and have received third-party data 122. The population of the virtual pool can be or represent, for example, the entire population of Internet users worldwide.

The virtual pool is divided into a number of sub-pools that each include fewer than all entities in the virtual pool (1404). As an example, the third-party content distribution system 110 can divide the users represented by step 1402 by geographic location, context data (e.g., information about online activity, interests, demographic information), and/or characteristics of individuals in general. Users can be divided, for example, by country, region, language, or some other geographically-based indicator. Users can also be divided into groups based on their interest in sports, music, medicine, etc., the web sites or types of web sites they visited, or the type of content they viewed in general. FIG. 6 identifies demographic groups into which the users can be divided.

Each of the sub-pools is sub-divided into delta pools (1406). The third-party content distribution system 110 can divide the sub-pools of step 1404 into even smaller groups of users.

Cookies are recorded for each of the delta pools when the particular portion of content is presented to or accessed by entities in the delta pools (1408). For example, the third-party content distribution system 110 can record cookies when a particular portion of content is presented to, or accessed by, users of user devices 106.

The recorded cookies are divided into cookie types based on characteristics of each recorded cookie (1410). As an example, the third-party content distribution system 110 can divide the recorded cookies by device type, such as desktop, mobile (e.g., smartphone), and tablet, as well as by app-cookie broken out by desktop, mobile, and tablet. Other types of characteristics of cookies can be used. In some implementations, characteristics of each recorded cookie can include a geographic location (e.g., latitude/longitude or global positioning system (GPS) coordinate) of a device on which the recorded cookie was placed. In some implementations, characteristics of each recorded cookie can include inferred demographics based on contents of the recorded cookie, such as by using information in the cookie to determine that the user is male, over 65, and interested in music.

A suite of machine learning and statistical analysis algorithms is used to automatically determine sizes of the delta pools and probabilities of each cookie type being classified as belonging to particular ones of the delta pools (1412). For example, Activity Distribution Function (ADF) techniques described above can enable multiple cookie counts to be converted to unique individual counts. In some implementations, descriptions of FIGS. 2A-4, for example, identify at least part of the training data that can be used in support of the suite of machine learning and statistical analysis algorithms. Further, Equations 6-19 can be used in determining the unique individual counts.

Virtual entities are assigned from the virtual pool to each of the recorded cookies that were recorded when the particular portion of content was presented or accessed (1414). For example, each of the users from the entire population of Internet users worldwide can be mapped to each of the cookies that has been identified by cookie type in the delta pools.

A number of unique entities that accessed the particular portion of content is determined, including counting a number of virtual entities that were assigned to the recorded cookies (1416). As an example, based on the mapping of the users from the entire population of Internet users worldwide to the cookies, the third-party content distribution system 110 can determine the number of unique entities by counting a number of unique virtual entities that were assigned to the recorded cookies.

Figure 15:
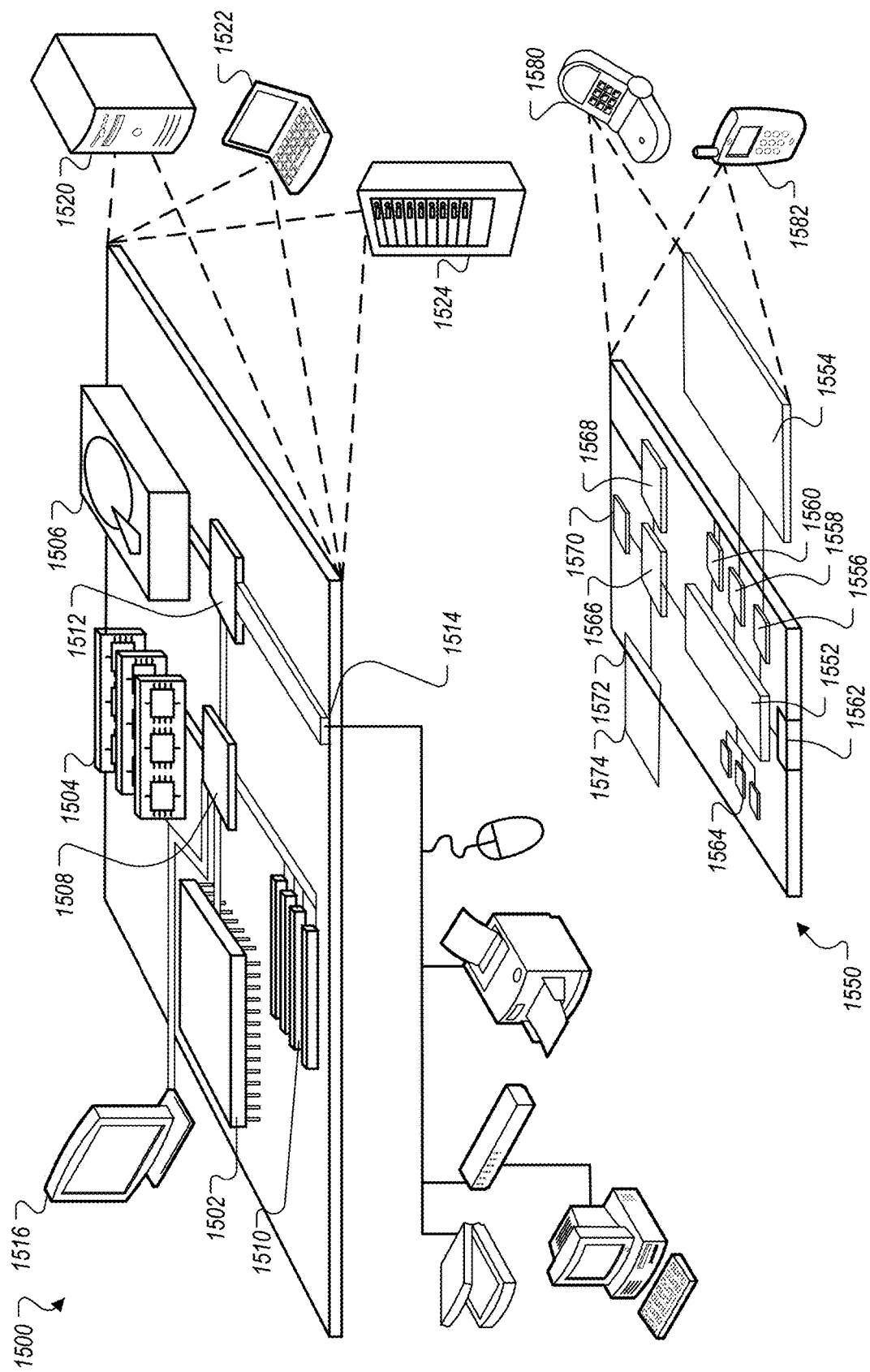
FIG. 15 is a block diagram of an example computer system that can be used to implement the methods, systems and processes described in this disclosure.

FIG. 15 is a block diagram of example computing devices 1500, 1550 that may be used to implement the systems and methods described in this document, as either a client or as a server or plurality of servers. Computing device 1500 is intended to represent various forms of digital computers, such as laptops, desktops, workstations, personal digital assistants, servers, blade servers, mainframes, and other appropriate computers. Computing device 1500 is further intended to represent any other typically non-mobile devices, such as televisions or other electronic devices with one or more processors embedded therein or attached thereto. Computing device 1550 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 1500 includes a processor 1502, memory 1504, a storage device 1506, a high-speed controller 1508 connecting to memory 1504 and high-speed expansion ports 1510, and a low-speed controller 1512 connecting to low-speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high-speed controller 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a computer-readable medium. In one implementation, the memory 1504 is a volatile memory unit or units. In another implementation, the memory 1504 is a non-volatile memory unit or units.

The storage device 1506 is capable of providing mass storage for the computing device 1500. In one implementation, the storage device 1506 is a computer-readable medium. In various different implementations, the storage device 1506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1504, the storage device 1506, or memory on processor 1502.

The high-speed controller 1508 manages bandwidth-intensive operations for the computing device 1500, while the low-speed controller 1512 manages lower bandwidth-intensive operations. Such allocation of duties is an example only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed bus 1514. The low-speed bus 1514 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as computing device 1550. Each of such devices may contain one or more of computing devices 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The computing device 1550 may also be provided with a storage device, such as a micro-drive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can process instructions for execution within the computing device 1550, including instructions stored in the memory 1564. The processor may also include separate analog and digital processors. The processor may provide, for example, for coordination of the other components of the computing device 1550, such as control of user interfaces, applications run by computing device 1550, and wireless communication by computing device 1550.

Processor 1552 may communicate with a user through control interface 1558 and display interface 1556 coupled to a display 1554. The display 1554 may be, for example, a TFT LCD display or an OLED display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provided in communication with processor 1552, so as to enable near area communication of computing device 1550 with other devices. External interface 1562 may provide, for example, for wired communication (e.g., via a docking procedure) or for wireless communication (e.g., via Bluetooth® or other such technologies).

The memory 1564 stores information within the computing device 1550. In one implementation, the memory 1564 is a computer-readable medium. In one implementation, the memory 1564 is a volatile memory unit or units. In another implementation, the memory 1564 is a non-volatile memory unit or units. Expansion memory 1574 may also be provided and connected to computing device 1550 through expansion interface 1572, which may include, for example, a subscriber identification module (SIM) card interface. Such expansion memory 1574 may provide extra storage space for computing device 1550, or may also store applications or other information for computing device 1550. Specifically, expansion memory 1574 may include instructions to carry out or supplement the processes described above, and may include secure information also. Thus, for example, expansion memory 1574 may be provided as a security module for computing device 1550, and may be programmed with instructions that permit secure use of computing device 1550. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552.

Computing device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1568 (e.g., a radio-frequency transceiver). In addition, short-range communication may occur, such as using a Bluetooth®, WiFi, or other such transceiver (not shown). In addition, GPS receiver module 1570 may provide additional wireless data to computing device 1550, which may be used as appropriate by applications running on computing device 1550.

Computing device 1550 may also communicate audibly using audio codec 1560, which may receive spoken information from a user and convert it to usable digital information. Audio codec 1560 may likewise generate audible sound for a user, such as through a speaker, e.g., in a handset of computing device 1550. Such sound may include sound from voice telephone calls, may include recorded sound (e.g., voice messages, music files, etc.) and may also include sound generated by applications operating on computing device 1550.

The computing device 1550 may be implemented in a number of different forms, as shown in the figure. For example, it may be implemented as a cellular telephone 1580. It may also be implemented as part of a smartphone 1582, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   creating a virtual pool of entities, the virtual pool having a virtual pool size equal to a size of a given set of entities;
   dividing the virtual pool into a number of sub-pools such that each of the sub-pools include fewer than all of the entities in the virtual pool and the entities included in each of the sub-pools each share a matching geographic location, online activity, or interest;
   sub-dividing each of the sub-pools into delta pools based on differences between the entities included in each of the sub-pools;
   recording cookies for each of the delta pools when a particular portion of content is presented to or accessed by entities in the delta pools;
   dividing the recorded cookies into cookie types based on characteristics of each of the recorded cookies according to geographic location of a device used to access the particular portion of content and inferred context information obtained from contents of the recorded cookie;
   automatically determining, using a suite of machine learning and statistical analysis algorithms, sizes of the delta pools and probabilities of each of the cookie types being classified as belonging to particular ones of the delta pools;

assigning, based on the sizes of the delta pools and the probabilities of each of the cookie types belonging to particular ones of the delta pools, the entities from the virtual pool to each of the recorded cookies that were recorded when the particular portion of content was presented or accessed; and determining a number of unique entities that accessed the particular portion of content, including counting a number of the entities that were assigned to the recorded cookies based on the sizes of the delta pools and the probabilities of each of the cookie types belonging to particular ones of the delta pools.

2. A non-transitory computer storage medium encoded with instructions that when executed by a distributed computing system cause the distributed computing system to perform operations comprising:

creating a virtual pool of entities, the virtual pool having a virtual pool size equal to a size of a given set of entities;

dividing the virtual pool into a number of sub-pools such that each of the sub-pools include fewer than all of the entities in the virtual pool and the entities included in each of the sub-pools each share a matching geographic location, online activity, or interest;

sub-dividing each of the sub-pools into delta pools based on differences between the entities included in each of the sub-pools:

recording cookies for each of the delta pools when a particular portion of content is presented to or accessed by entities in the delta pools;

dividing the recorded cookies into cookie types based on characteristics of each of the recorded cookies according to geographic location of a device used to access the particular portion of content and inferred context information obtained from contents of the recorded cookie:

automatically determining, using a suite of machine learning and statistical analysis algorithms, sizes of the delta pools and probabilities of each of the cookie types being classified as belonging to particular ones of the delta pools;

assigning, based on the sizes of the delta pools and the probabilities of each of the cookie types belonging to particular ones of the delta pools, the entities from the virtual pool to each of the recorded cookies that were recorded when the particular portion of content was presented or accessed; and determining a number of unique entities that accessed the particular portion of content, including counting a number of the entities that were assigned to the recorded cookies based on the sizes of the delta pools and the probabilities of each of the cookie types belonging to particular ones of the delta pools.

3. A system comprising:

one or more processors; and one or more memory elements including instructions that, when executed, cause the one or more processors to perform operations including:

creating a virtual pool of entities, the virtual pool having a virtual pool size equal to a size of a given set of entities;

dividing the virtual pool into a number of sub-pools such that each of the sub-pools include fewer than all of the entities in the virtual pool and the entities included in each of the sub-pools each share a matching geographic location, online activity, or interest;

sub-dividing each of the sub-pools into delta pools based on differences between the entities included in each of the sub-pools;

recording cookies for each of the delta pools when a particular portion of content is presented to or accessed by entities in the delta pools;

dividing the recorded cookies into cookie types based on characteristics of each of the recorded cookies according to geographic location of a device used to access the particular portion of content and interred context information obtained from contents of the recorded cookie:

automatically determining, using a suite of machine learning and statistical analysis algorithms, sizes of the delta pools and probabilities of each of the cookie types being classified as belonging to particular ones of the delta pools;

assigning, based on the sizes of the delta pools and the probabilities of each of the cookie types belonging to particular ones of the delta pools, the entities from the virtual pool to each of the recorded cookies that were recorded when the particular portion of content was presented or accessed; and determining a number of unique entities that accessed the particular portion of content, including counting a number of the entities that were assigned to the recorded cookies based on the sizes of the delta pools and the probabilities of each of the cookie types belonging to particular ones of the delta pools.

* * * * *

UNITED STATES PATENT AND TRADEMARK OFFICE
CERTIFICATE OF CORRECTION

| | | |
|---|---|---|
| PATENT NO. | : 10,594,813 B1 | Page 1 of 1 |
| APPLICATION NO. | : 15/487229 | |
| DATED | : March 17, 2020 | |
| INVENTOR(S) | : Koehler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this
Twenty-fourth Day of November, 2020

Andrei Iancu
*Director of the United States Patent and Trademark Office*